United States Patent [19]

Shimizu et al.

[11] Patent Number: 4,866,702
[45] Date of Patent: Sep. 12, 1989

[54] STAR TOPOLOGY LOCAL AREA NETWORK

[75] Inventors: Horoshi Shimizu; Yoshihiko Katsura; Hidenori Sakamoto; Tsurayuki Kawatoko, all of Tokyo, Japan

[73] Assignee: NEC Corporation, Tokyo, Japan

[21] Appl. No.: 247,186

[22] Filed: Sep. 21, 1988

[30] Foreign Application Priority Data

Sep. 22, 1987 [JP] Japan .............................. 62-239522
Sep. 30, 1987 [JP] Japan .............................. 62-248349
Oct. 30, 1987 [JP] Japan .............................. 62-276390

[51] Int. Cl.[4] .............................................. H04J 3/26
[52] U.S. Cl. .................................... 370/60; 370/85.6; 370/94.3
[58] Field of Search ...................... 370/60, 61, 85, 94

[56] References Cited

U.S. PATENT DOCUMENTS 4,550,402 10/1985 Gable et al. ............................ 390/94

Primary Examiner—Douglas W. Olms
Assistant Examiner—Melvin Marcelo
Attorney, Agent, or Firm—Sughrue, Mion, Zinn, Macpeak & Seas

[57] ABSTRACT

A star topology local area network comprises a data bus, a receive-not-ready bus, a plurality of bus access units associated respectively with user terminals for receiving a request therefrom, and an arbiter for assigning priority to one of the bus access units when requests for transmission occur simultaneously. Each of the bus access units comprises a transmit buffer for storing a packet from the associated user terminal and forwarding it to the data bus when priority is assigned to it and a receive buffer for storing a packet from the data bus and forwarding it to the associated user terminal. An address filter is provided in each bus access unit to detect a packet addressed to it and applies a receive-not-ready signal to the receive-not-ready bus when the receive buffer has an insufficient capacity to receive the detected packet. A bus access controller is connected to the receive-not-ready bus for terminating the transmission of a packet in response to the receive-not-ready signal. The storage capacity of the transmit buffer is also monitored and a proceed-to-send signal is transmitted from the bus access unit to the associated user terminal indicating the permission of transmission when the detected storage capacity is sufficient to receive a packet from the terminal.

23 Claims, 17 Drawing Sheets

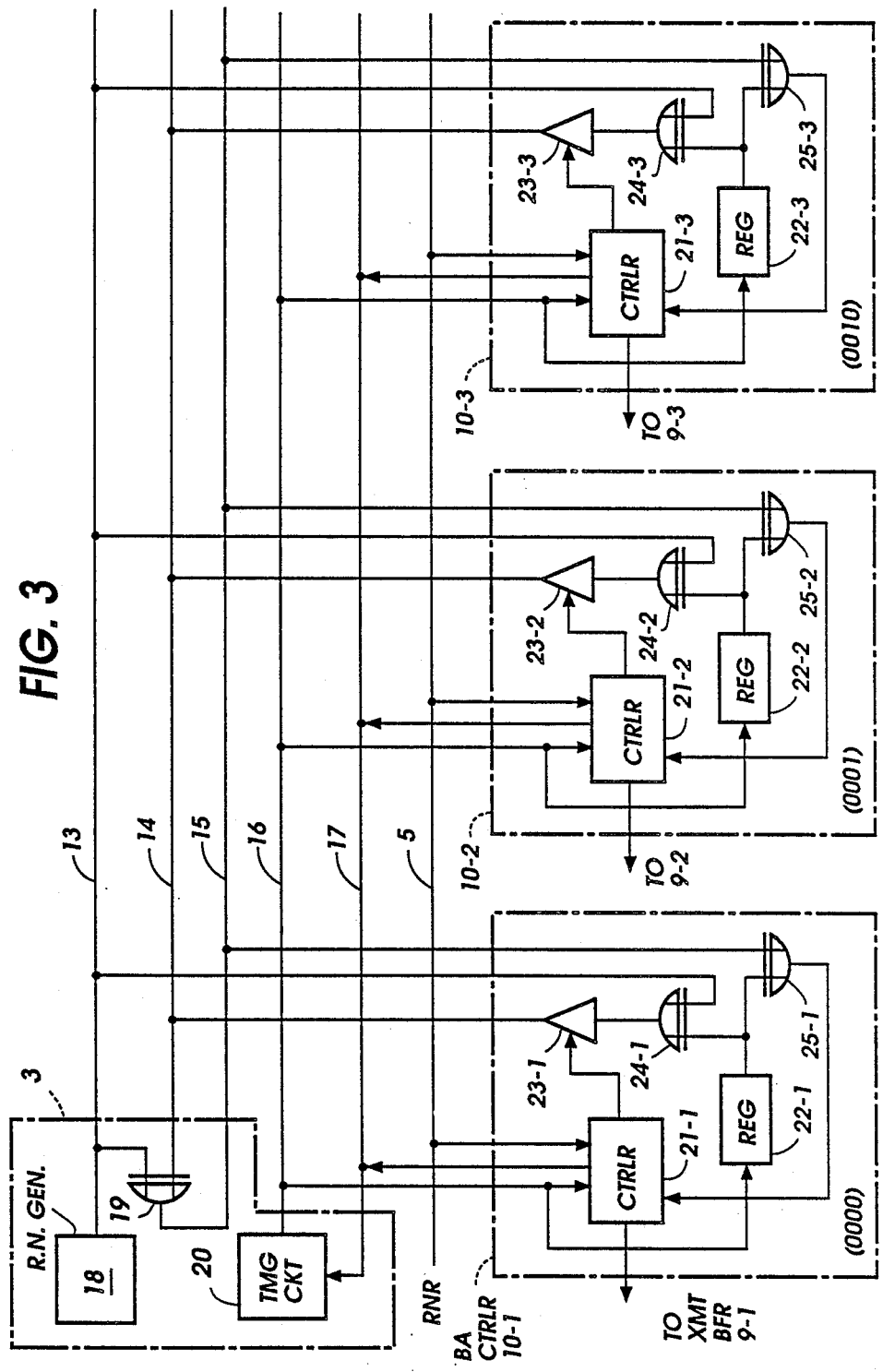

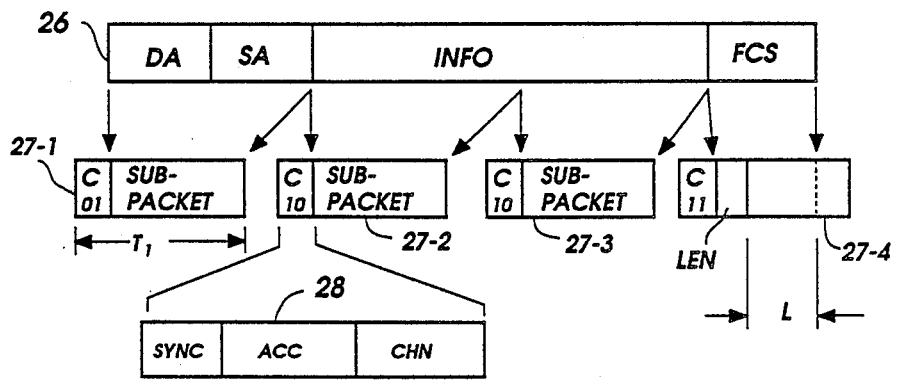
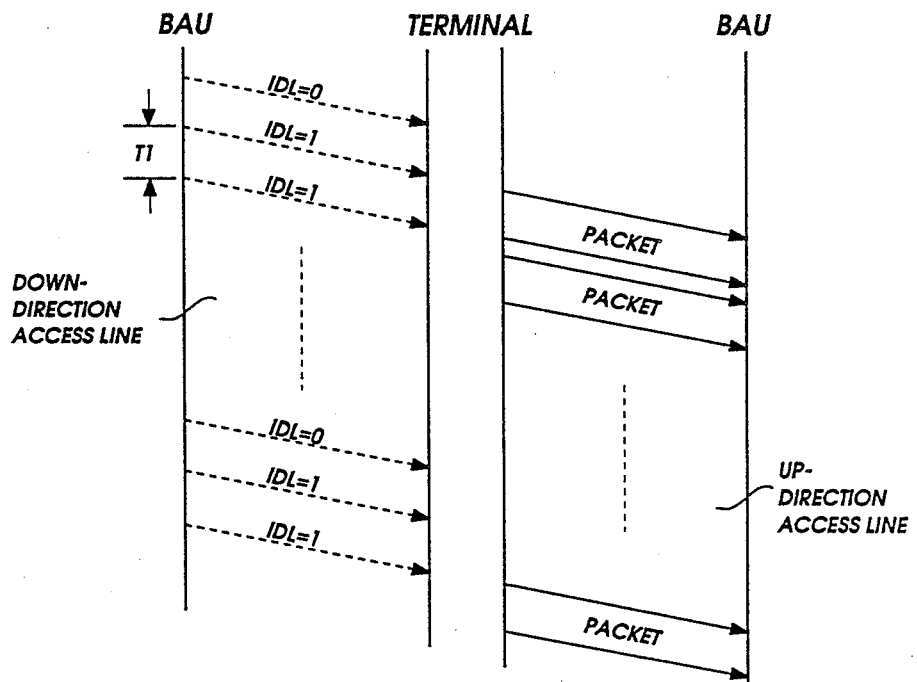
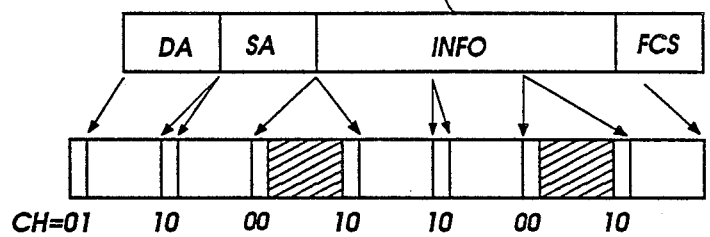

LEGEND  X=0: XMT RQST PRESENT
X=1: XMT RQST ABSENT

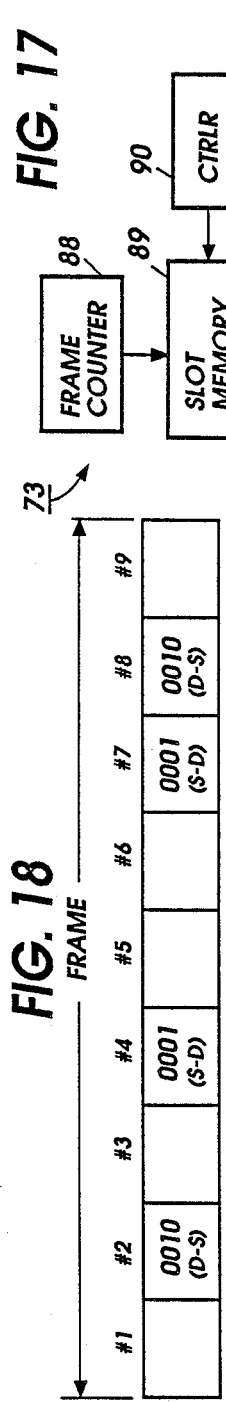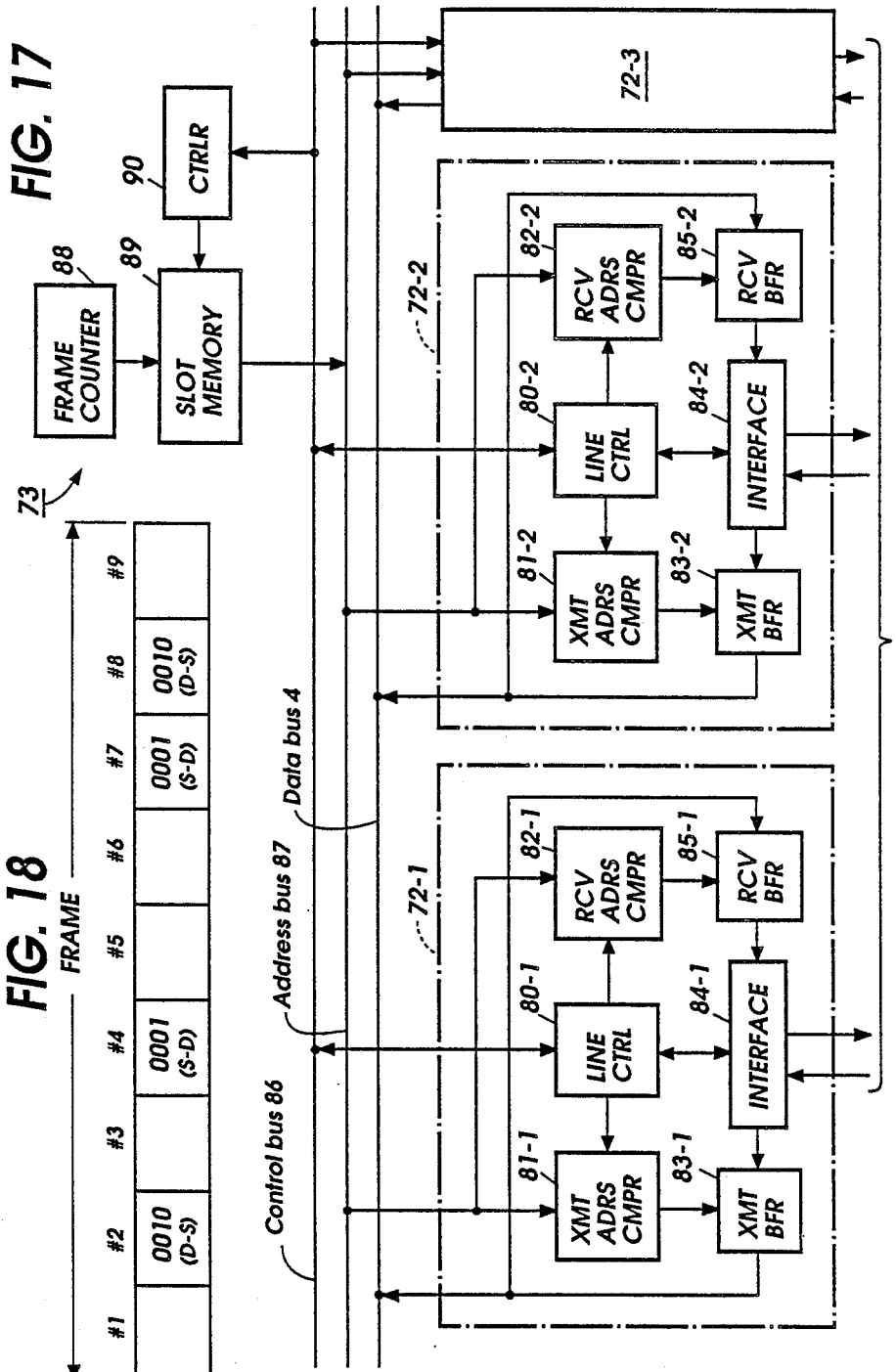

STAR TOPOLOGY LOCAL AREA NETWORK

BACKGROUND OF THE INVENTION

The present invention relates generally to local area networks, and more specifically to a local area network having a star topology.

A known star topology local area network is made up of a plurality of user terminals which are distributed in a star topology and connected through user access lines to the common data bus of a network node. The network requires that the transmission speed of data on the data bus be equal to the transmission speed of data on the user access lines. If the network needs to serve many user terminals with high throughput capability the speed of the bus must be increased. This, however, requires the user terminals to increase their operating speeds commensurate with the high transmission speed of the data bus. This results in an increase in cost of the user terminals. Since the prior art local area network employs a collision detection technique for accessing the common data bus, the probability of data collision increases with traffic, and hence the system throughput is limited.

SUMMARY OF THE INVENTION

It is therefore an object of the present invention to provide a star topology local area network which permits the transmission speed of the user access lines to be determined independently of the transmission speed of the network node while ensuring a high throughout capability during high traffic periods.

More specifically, the star topology local area network of the present invention comprises a data bus, a receive-not-ready bus, a plurality of bus access units associated respectively with user terminals for receiving a request therefrom, and an arbiter for assigning priority, or the right to use the data bus, to one of the bus access units when requests for transmission occur simultaneously. Each of the bus access units comprises a transmit buffer for storing a packet from the associated user terminal and forwarding it to the data bus when priority is assigned to it and a receive buffer for storing a packet from the data bus and forwarding it to the associated user terminal. An address filter is provided in each bus access unit to detect a packet addressed to it and applies a receive-not-ready signal to the receive-not-ready bus when the receive buffer has an insufficient capacity to receive the detected packet. A bus access controller is connected to the receive-not-ready bus for terminating the transmission of a packet in response to the receive-not-ready signal. The storage capacity of the transmit buffer is also monitored and a proceed-to-send signal is transmitted from the bus access unit to the associated user terminal indicating the permission of transmission when the detected storage capacity is sufficient to receive a packet from the terminal.

The provision of the transmit and receive buffers in each bus access unit allows the transmission speed of signals between user terminals and the access units can be determined regardless of the transmission speed of data on the data bus, and further allows direct memory addressing (DMA) to be employed between user terminals and the associated bus access units. This simplifies the configuration of the terminal interface in comparison with conventional multiple access local area networks. Since the access to the data bus is implemented by arbitration control, high throughput can be obtained even if the network is at peak traffic load. In addition, the flow control in the network minimizes the loss of packets on the data bus.

Preferably, each of the user terminals transmits a signal to the associated bus access unit to indicate when it is not ready to receive a packet from the associated bus access unit, and the associated bus access units responds to it by disabling the transmission of a packet to the associated user terminal. This flow control allows the use of a flag which simplifies protocols between source and destination terminals.

The present invention allows a group of user terminals to be connected to a single bus access unit. In such embodiments, each of the bus access units comprises a controller for selecting one of the user terminals of the group which simultaneously generate a request for transmission and a selector for coupling one of such user terminals to the transmit buffer identified by the controller. The output of the receive buffer may be connected together to the user terminals if they are provided with an address filter, or otherwise connected through a distributor which identifies the destination.

A further advantage of the present invention is that it allows a circuit switching system to share the data bus of the local area network so that packet- and circuit-switched communications can be integrated without substantially modifying the conventional circuit switching software. In an integrated system, circuit-switched user terminals are connected to line circuits which are in turn connected to a circuit switching controller which defines time slots on the data bus and controls the line circuits to transmit their signals on the defined time slots. Idle time slots on the data bus are detected to activate the bus access units of the local area network to allow packets to be multiplexed into the detected idle time slot. According to another integrated system, each of the user terminals of the local area network is further connected to a line circuit of the circuit switching system through a multiplexer and a demultiplexer.

A circuit switching controller defines time slots on the data bus and controlling the line circuits to transmit circuit-switched signals to the data bus on the defined time slots. In this way, the bandwidth of a packet-switched network can be dynamically controlled in accordance with the bandwidth of a circuit-switched network.

According to a further aspect, the arbiter of the present invention comprises first, second and third lines to which the bus access units are connected, a random number generator for applying a random sequence of bit to the first line, and an exclusive OR gate having inputs connected respectively to the first and second lines and an output connected to the third line. Each of the bus access units comprises a register for generating a sequence of address bits in response to a timing pulse from the arbiter, a first exclusive OR gate having a first input connected to the first line and a second input connected to the output of the register, and a second exclusive OR gate having a first input connected to the third line and a second input connected to the output of the register to detect a coincidence between the logic levels of the first and second inputs thereof. Wired logical product of a first logic output from the first exclusive OR gate is presented to the second line in response to the timing pulse and a wired logical product of subsequent logic outputs from the first exclusive OR gate is presented to the second line in response to the occurrence of the coincidence detected by the second exclusive OR gate. The transmit buffer discards a packet stored therein if the coincidence does not occur for each of the address bits and forwards it to the data bus if the coincidence occurs for each of the address bits. Because of the random sequence, priority is assigned with equal probability to bus access units when competition arises.

BRIEF DESCRIPTION OF THE DRAWINGS

The present invention will be described in further detail with reference to the accompanying drawings, in which:

FIG. 3 is a block diagram illustrating details of the bus access controllers of FIG. 2;

FIG. 4 is a data format of the packet transmitted between user terminals and their associated bus access units;

FIG. 5 is a sequence diagram illustrating data flow between user terminals and their associated bus access units;

FIG. 6 is a data format of a packet which is stuffed with subpackets containing no information;

FIG. 17 is a block diagram illustrating details of the embodiment of FIG. 14;

FIG. 18 is a frame format employed in the embodiment of FIG. 17; and

DETAILED DESCRIPTION

Figure 1:
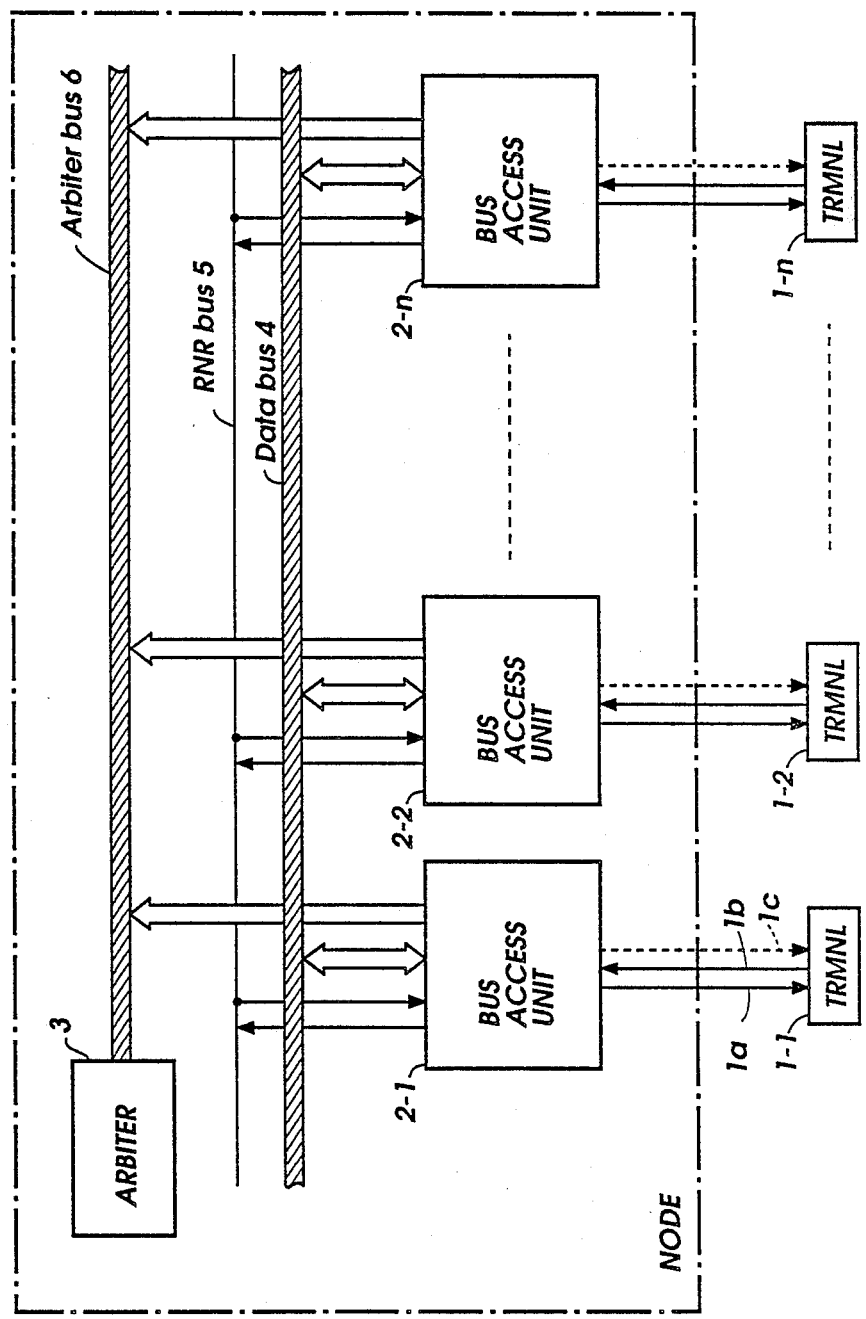
FIG. 1 is a block diagram of a star topology local area network according to a first embodiment of the present invention.
Figure 2:
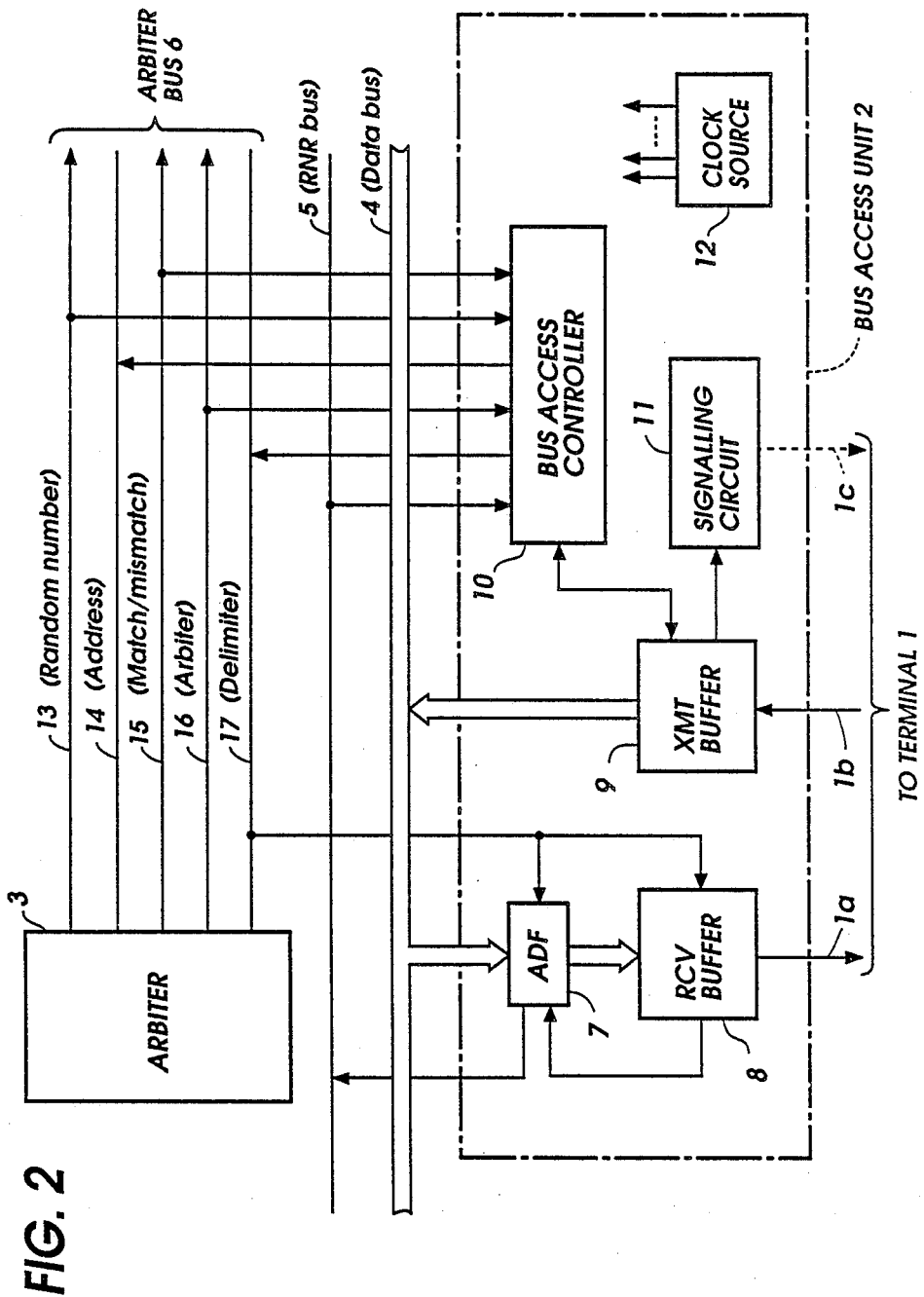
FIG. 2 is a block diagram showing details of each of the bus access units of FIG.1.

Referring now to FIG. 1, there is shown a star topology local area network according to a first embodiment of the present invention. The star topology local are network comprises a node and a plurality of packet user terminals 1—1 through 1-n. The node is made up of a plurality of bus access units 2-1 through 2-n associated respectively with packet user terminals 1—1 to 1-n through down-direction access lines 1a, up-direction access lines 1b and signalling lines 1c. Each bus access unit 2 is accessible to a data bus 4 and an arbiter bus 6 under control of an arbiter 3. Bus access units 2 are also accessible to a receive-not-ready (RNR) bus 5. As shown in FIG. 2, each bus access unit 2 is formed by an address filter 1, a receive buffer 8, a tansmit buffer 9, a bus access controller 10 and a signalling circuit 11, all of which are synchronized with a clock source 12. Arbiter bus 6 comprises a set of lines 13 to 15 for respectively carrying a random number from the arbiter 3 to all bus access units 2, address information from each bus access unit to the arbiter 3, and match/mismatch information from arbiter 3 to all access units 2. The logic states 0 and 1 on match/mismatch line 15 indicate respectively whether an address bit on line 14 match and mismatch a logic state that occurs randomly on line 13. Arbiter bus 6 further include an arbiter line 16 and a delimiter line 17 for carrying timing information. The logic state of the delimiter line 17 indicate the busy/idle status of the data bus 4. Specifically, when any one of the bus access units 2 is using the data bus 4, it applies a logic "0" to line 17 to indicate the busy status of the data bus.

In FIG. 3, arbiter 3 includes a random number generator 18 for sypplying a random sequence of binary 1's and 0's to line 13, an exclusive OR gate 19 having inputs connected to lines 13 and 14 and an output connected to line 15, and a timing circuit 20 which receive inputs on line 17 and supplies a timing pulse to line 16. Each bus access controller 10 comprises a controller 21 which is connected to an input of the transmit buffer 9 of the own bus access unit and further connected to the arbiter and delimiter lines 16, 17 and to the RNR bus 5 to grant the right to use the data bus 4 to one of those bus access units 2 among which competition arises. An address register 22 stores an address which is uniquely assigned to the associated user terminal and begins with a 0-bit. For example, bus access controllers 10-1, 10-2 and 10-3 are assigned four-bit addresses "0000", "0001" and "0010", respectively. Address register 22-1 of the bus access controller 10-1 supplies the binary sequence "0000" to a first input of an exclusive OR gate 24-1 in response a pulse input from the arbiter line 16. The second input of each exclusive OR gate 24 is supplied with a random pulse from line 13 and couples its output to a gate circuit 23 having an open-collector output which is connected to line 14. Each of the gate circuits 23, when disabled, supplied a logic-1 level output to line 14 and, when enabled, supplies the output of the associated exclusive OR gate 24, and cooperates with the other gate circuits 23 to form a wired logical product, or AND gate. Therefore, when gate circuits 23 are all disabled, the address line 14 is at logic 1 and when enabled they pass the outputs of exclusive OR gates 24 to the address line 14 so that the logic state of line 14 is a logical product of the outputs of exclusive OR gates 24 associated with the enabled gate 23. The output of register 22 is further coupled to a first input of an exclusive OR gate 25 whose second input is connected to line 15 to supply its output to the controller 21.

As shown in FIG.4, each packet user terminal 1 generates a packet 26 which is composed of a destination address (DA) field, a source address field (SA), an information (INFO) field and a frame check sequence (FCS). Prior to transmission, each packet is disassembled into four subpackets 27-1 to 27-4, for example. Each subpacket is of duration $T_1$, or time slot, and contains a control field designated C. Each control field C is composed of a slot timing sync field SYNC, and an access field ACC for transmitting signals such as flow control, busy/idle status (IDL), transmit request and access grant. A two-bit chain field CHN indicates the position of each subpacket 27 within the packet 26. The first subpacket 27-1 contains chain bits CHN=01 indicating the beginning of a packet 26 and the last packet contains 27-4 chain bits "11" indicating the end of the packet 26. Intermediate subpackets 27-2 and 27-3 contain chain bits "10". The last subpacket 27-4 further includes a field designated LEN that indicates the length of data contained in that subpacket. If the data field of the last subpacket is completely filled with data bits, the next subpacket contains chain bits "11" and the length field LEN of that subpacket is filled with bit "0". Therefore, the transmit buffer 9 can detect the beginning and end of the packet 26 using the chain bits CHN=01, CHN=11 and the length field LEN to assembly the subpackets into the original packet 26. The address filter 1 of each bus access unit constantly examines the destination address fiedl DA of each packet propagating along the data bus 4 to determine whether the packet is addressed to it or not. If the packet from the terminal 1—1 is addressed to terminal 1-2, the address filter 7 of bus access units 1-2 controls the receive buffer 8 to accept the incoming packet and examine its storage level to determine whether its capacity is sufficient to accept that packet. If no sufficient capacity is left in the receive buffer 8, it transmits a receive-not-ready (RNR) signal through the RNR bus 5 to the transmitting bus access unit 2 to cause it to terminate the transmission, whereupon the right to use the data bus 4 is shifted to another bus access unit in a manner as will be described. On terminating the packet transmission, the transmit-mode bus access unit 2 resumes the transmission following a delay time which is determined according to a prescribed pseudo-random algorithm.

If a packet is stored into the receive buffer 8 of the destination bus access unit 2, it is disassembled again into several subpackets in a manner as described above and transmitted through down-direction access line to the destination user terminal 1 where the subpackets are assembled into a packet. If the data handling speed of a subscriber terminal is lower than the transmission speed of its subscriber lines, the sequence of transmitted packets is stuffed with one or more additional packets each containing a chain field CHN=00 and a vacant data field (as indicated by hatchings in FIG. 6).

During the time prior to transmission of subpackets from any of the user terminals 1 to the associated bus access unit 2, the storage level of transmit buffer 9 of that bus access unit is constantly examined. If the storage level of transmit buffer 9 is sufficient to accept a fresh packet, the signalling circuit 11 is notified of this fact from transmit buffer 9 and writes IDL=1 into the subfield ACC of a subpacket, indicating that the transmit buffer 9 is ready to accept. The source terminal 1 receives this subpacket through the signalling line 1c during a time slot $T_1$ as shown in FIG. 5 and examines its access subfield ACC and proceeds to disassemble a packet into several subpackets as described above and transmits them in sequence through up-direction line 1b to the associated bus access unit 2.

On the other hand, the timing circuit 20 of the arbiter 3 constantly monitors the logic state of the delimiter line 17. On detecting a logic-1 state on delimiter line 17 indicating that the data bus 4 is idle, the timing circuit 20 introduces a delay time t (see FIG. 7A) and forwards a logic-1 pulse to the arbiter line 16 at the end of the delay time t.

If the user terminal 1—1 has a packet to transmit, it sends a subpacket containing a transmit request in the ACC subfield. Controller 21-1 of bus access controller 10-1 associated with the user terminal 1—1 (see FIG. 3) examines the ACC subfield of the subpacket, detects the transmit request in it and proceeds to monitor the logic state of the arbiter line 16 to detect when it goes logic-1. In response to the detection of a logic-1 state on line 16 indicating that the data bus 4 is now idle, controller 21-1 applies a logic-1 to the arbiter line 16 and applies a gating signal to the gate 23-1 and register 22-1 is enabled to supply a first bit of the stored address. With this gating signal, the open-collector gate 23-1 is activated to pass the output of exclusive OR gate 24-1. Simultaneously, if user terminals 1-2 and 1-3 have packets to transmit, transmit requests are received in bus access units 2—2 and 2-3, and similar circuit operations take place in the bus access controllers 10-2 and 10-3 and hence competitions arise between bus access controllers 10-1, 10-2 and 10-3.

Figure 7A:
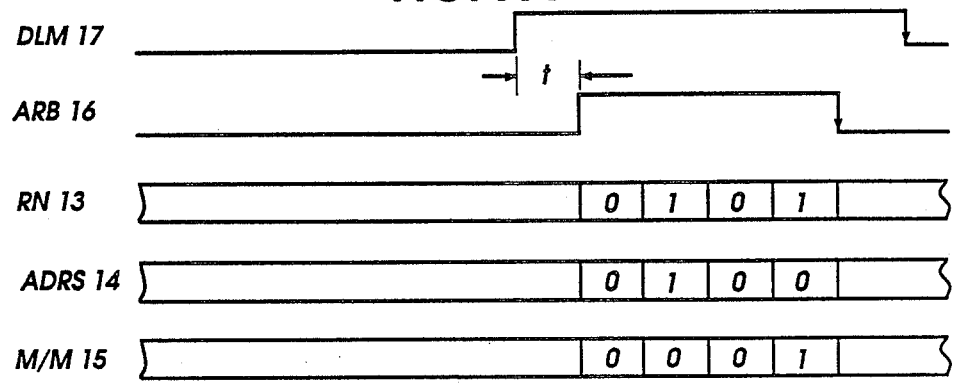
FIGS. 7A, 7B and 7C are timing diagrams illustrating priority granting processes by which priority is given to competing bus access units to access the data bus.

The operation of the bus access controllers 10 will be described with reference to FIG. 7A. Assume that the random number generator 18 produces "0101" bits in sequence. Each of the exclusive OR gates 23-1, 23-2 and 23-3 generates "01" bits in sequence in response to the first and second bits of the random sequence since the first two bits of the addresses of the competing units are "00". By virtue of the wired logical product formed by the gate circuits 23 of the competing access controllers, the binary sequence "01" appears at the address line 14. Since this binary sequence matches the first two bits of the random sequence, the output of exclusive OR gate 19 is a sequence of "00" bits, which is applied through line 15 to the exclusive OR gates 25 of the competing access controllers 10. Since the same logic state appears on line 15 as the logic state of the first and second address bits of the competing controllers 10-1, 10-2, 10-3, the exclusive OR gates 25-1, 25-2, 25-3 supply "00" bits in sequence to the associated controllers 21-1, 21-2, 21-3. According the invention, a logic-0 bit from the exclusive OR gate 25 of each bus access controller 10 indicates that the own controller 10 should continue competing with other controllers 10 and a logic-1 bit from that gate represents that it should discontinue the competition. Thus, controllers 21-1, 21-2, 21-3 respond to the first and second outputs generated in sequence from the associated exclusive OR gates 25 and directs their associated transmit buffers 9-1, 9-2 and 9-3 to keep transmit requests. Therefore, any of such controllers does not abandon their attempts in their race to obtain the right to use the data bus 4 up to this point of time.

In response to the third bit, or "0", of the random sequence, a logic "0" output is delivered from exclusive OR gates 24-1 and 24-2 and a logic "1" from exclusive OR gate 24-3. By virtue of the wired logic product operations by gate circuits 23-1, 23-2, 23-3 on these logic outputs, the address line 14 is driven to a logic state "0". Thus, there is a match between the inputs of exclusive OR gate 19 of the arbiter 3, applying a logic "0" on line 15 to exclusive OR gates 25-1, 25-2, 25-3. this causes exclusive OR gates 25-1 and 25-2 to supply logic-0 outputs to their timing circuits 25-1 and 21-2 and causes exclusive OR gate 25-3 to supply a logic-1 output to controller 21-3. Gate circuits 23-1 and 23-2 remain enabled to supply the next address bits to the address line 14, while gate circuit 23-3 is disabled to cease the application of its next address bit. Thus, the address controllers 10-1 and 10-2 survived the address controller 10-3 at the third address bit.

In response to the fourth bit ("0") of the random sequence, the exclusive OR gates 24-1 and 24-2 generate logic-1 and logic-2 outputs, respectively. As a result, the address line 14 is driven to a logic-0 state which causes exclusive OR gate 19 of the arbiter to supply a logic-1 bit on line 15 to exclusive OR gates 25-1 and 25-2, causing them to supply logic-1 and logic-0 outputs to timing circuits 21-1 and 21-2, respectively. Thus, access controller 10-1 withdraws from the final competition and access controller 10-2 and hence terminal 1-2 finally survives, obtaining the right to use the data bus 4.

With the right to use being granted, the controller 21-2 applies a logic-0 to the delimiter line 17, signalling the busy status of the data bus 4 to all other access units 10, and causes the associated transmit buffer 9 to forward the stored packet to the data bus 4. By virtue of the randomness, priority is given with equal probabilities to only one of terminals 1 racing in a competition. If the random number changes to a sequence "1010", user terminal 1-2 is then given priority in the assumed competition. In this way, the access right is granted after a series of address bits has been forwarded to the address line 14.

Figure 7B:
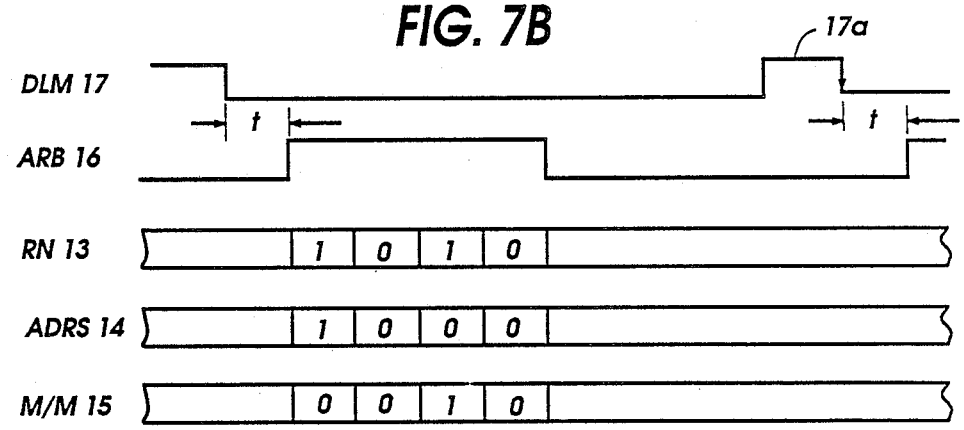

FIG. 7B illustrates another example for granting the access right. In this example, the granting procedure is performed during the period the data bus 4 is being used by other user terminal and transmission from the granted terminal begins as soon as the data bus 4 becomes free. In this example, the timing circuit 20 of the arbiter 3 constantly monitors the logic state of the delimiter line 17 to detect when it goes logic-0. On detecting a logic-0 state on delimiter line 17 indicating that the data bus 4 is in use, the timing circuit 20 introduces a delay time t and forwards a logic-1 pulse to the arbiter line 16 at the end of the delay time t. As in the example of FIG. 7A, each controller 21 is designated to detect a logic-1 state on arbiter line 16 to apply a gating signal to the associated gate circuit 23. If the random sequence is "1010" and a competition arises between user terminals 1—1, 1-2 and 1-3 while the data bus 4 is being used by another user terminal, priority will be given to user terminal 1-3. Controller 21-3 monitors the logic state of delimiter line 17 to detect the trailing edge of a logic-1 pulse 17a indicating that the data bus 4 is now idle. In response to this trailing edge, controller 21-3 enables the transmit buffer 9-3 to initiate the transmission of a packet to the data bus 4.

Figure 7C:
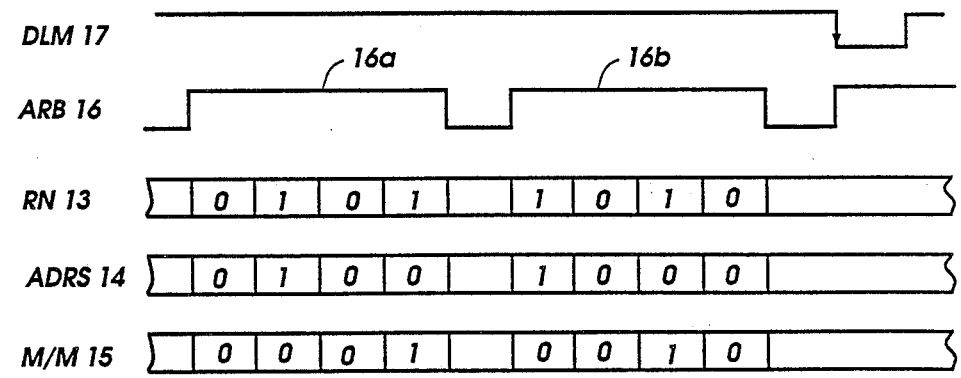

FIG. 7C is a further example in which priority granting procedure is effected at periodic intervals regardless of the busy/idle status of the data bus 4. Timing circuit 20 applies a series of timing pulses 16a and 16b to the arbiter line 16 at periodic intervals regardless of the busy/idle status of the data bus. A priority granting procedure is performed during the period of each of the pulses 16a and 16b, so that during the first period priority is given to user terminal 1-2 and during the second period priority is given to user terminal 1-3. Each of the controllers 21-2 and 21-3 of the granted user terminals 1-2 and 1-3 monitors the logic state of the delimiter line 17 to detect when it goes logic-0. If the delimiter line 17 goes logic-0 before the next granting procedure begins, the priority just given in the previous period is rendered valid to allow transmission. Otherwise, the priority is rendered invalid and is shifted to a user terminal which is determined in a subsequent granting procedure. Therefore, controller 21-2 abandons the priority which is given during the period of pulse 16a and controller 21-3 obtains a valid priority to transmit packets.

Figure 8:
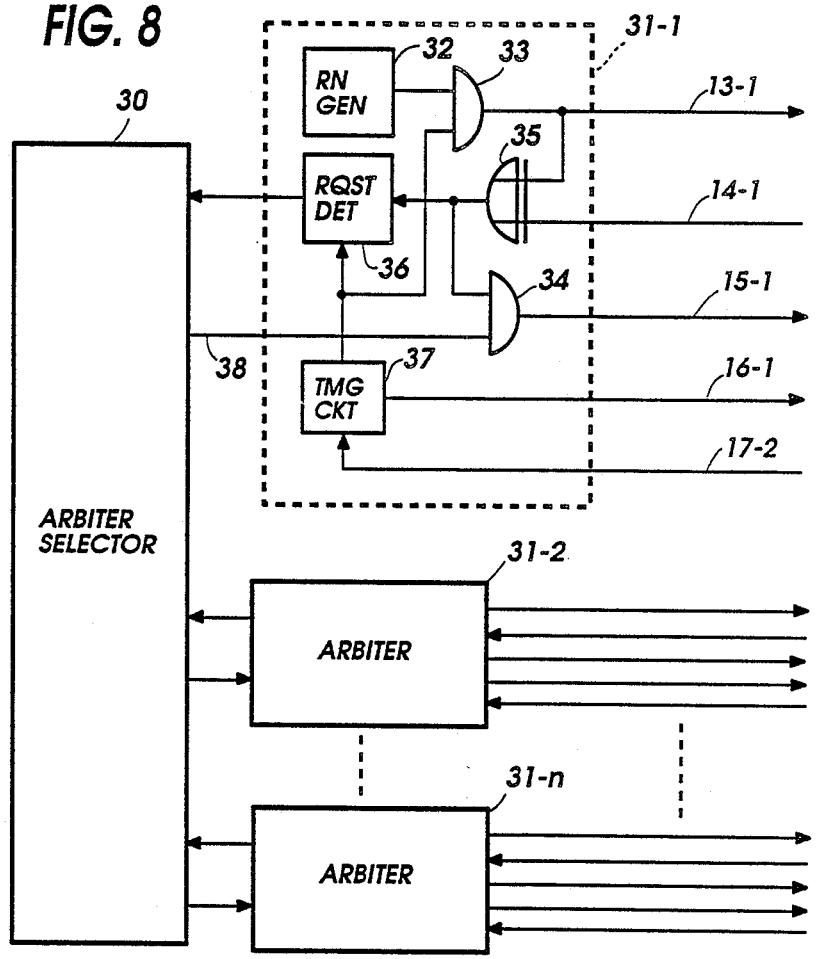
FIG. 8 is a block diagram of a modified embodiment of the present invention in which user terminals are served by different arbiters.
Figure 9:
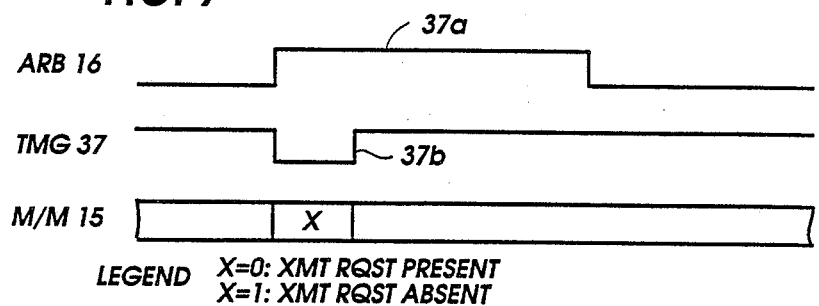
FIG. 9 is a timing diagram associated with FIG. 8.

A modification of the first embodiment of the present invention is shown in FIG. 8. In this modification, a single arbiter selector designated 30 is provided to control a plurality of arbiters 31-1 to 31-n each serving a group of user terminals. Each of the user terminals is assigned an address which is unique to the group to which it belongs. It is assumed that the highest bit of each address is a "0" and the lowest bit is a "1". Each of the arbiters 31 comprises a random number generator 32, AND gates 33, 34 an exclusive OR gate 35, a transmit request detector 36, and a timing circuit 37. Timing circuit 37 generates a logic-0 pulse 37b (see FIG. 9) in response to the leading edge of a logic-1 pulse 37a appearing on the arbiter line 16 and supplies it to the transmit request detector 36 and to one input of the AND gate 33 to which the output of random number generator 32 is also applied. Therefore, in response to the first bit of an address supplied to the address line 14 from a given bus access controller 10, a logic-0 output is applied to the line 13 and to one input of the exclusive OR gate 35. As a result, the first bit ("0") of that given bus access controller 10 switches the address line 14 to a logic-0 state. The output of exclusive OR gate 35 is applied to the detector 36 and to one input of the AND gate 34 to which a logic-1 signal is also supplied from the arbiter selector 30 through a line 38 when the arbiter 31 concerned is selected by arbiter selector 30 as described hereinbelow. The output of AND gate 34 is connected to line 15. Therefore, the line 15 is switched to a logic-0 state in response to the application of the first logic-0 bit to line 14. If there is no packet to be transmitted from any of the bus access units 2 within each group, the address line 14 of each group and hence the line 15 of each group remains at logic-1 state. Therefore, the logic-0 input from the exclusive OR gate 35 to detector 36 in the presence of a logic-0 input from the timing circuit 37 indicates the presence of a transmit request from one of the user terminals of the same group. On detecting a transmit request, the transmit request detector 36 applies a logic-1 to the arbiter selector 30. Arbiter selector 30 is designed to select one of the logic-1 inputs which are simultaneously supplied from two or more arbiters 31 and switches the logic states of the lines 38 AND gates 34 of the nonselected arbiters 31 to 0.

Figure 10:
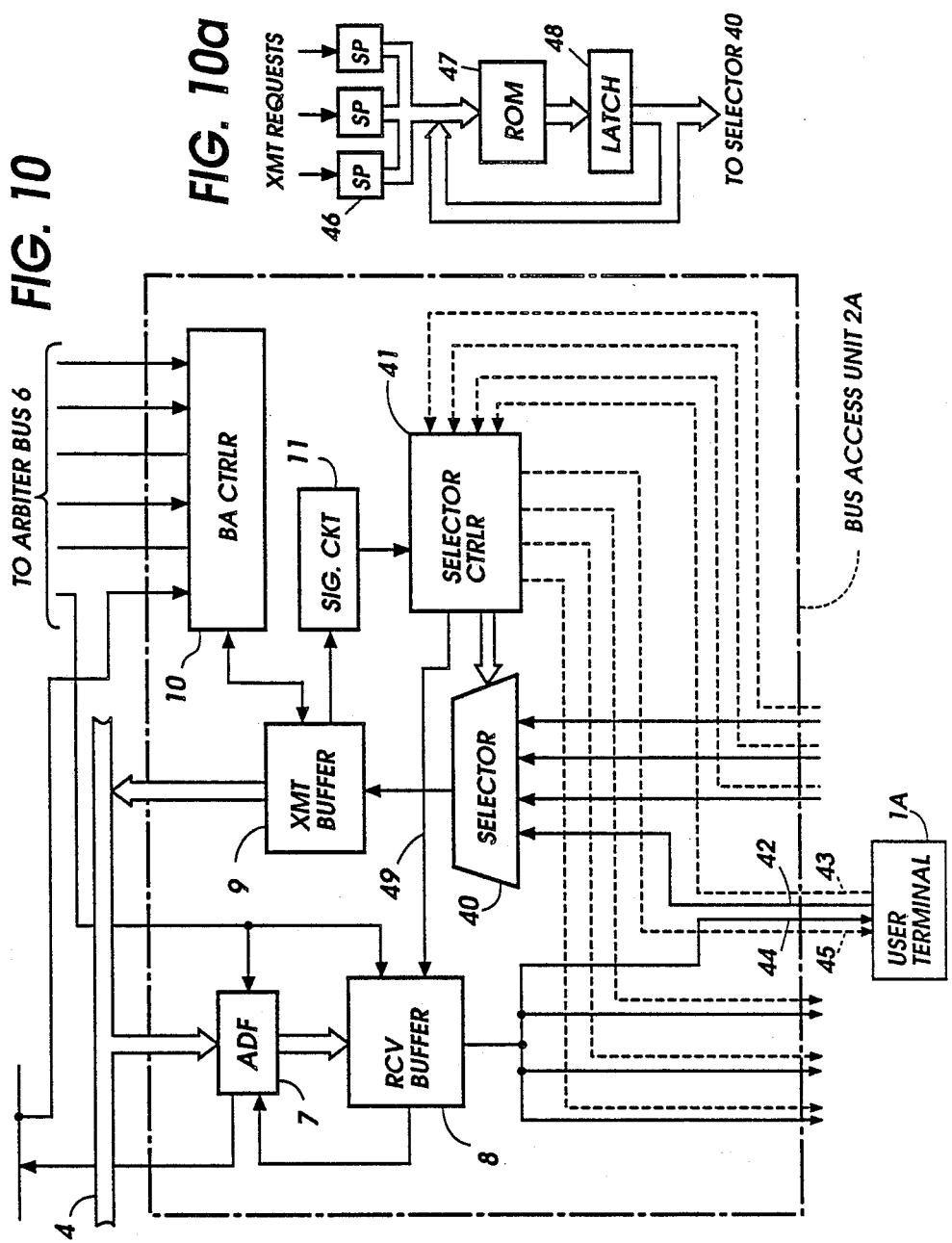
FIG. 10 is a block diagram of a further modification of the invention in which a group of user terminals is connected to a single bus access unit, with FIG. 10a showing details of the selector controller of FIG. 10.

FIG. 10 is a block diagram of a further modification of the first embodiment of the present invention in which a group of packet user terminals 1A are connected to a single bus access unit 2A. Bus access unit 2A is similar in construction to the unit 2 of the previous embodiment with the exception that it further includes a selector 40 connected to the input of transmit buffer 9 and a selector controller 41 which controls the selector 40 when enabled by the signalling circuit 11 in response to a transmit request from user terminals. As in the previous embodiment, the signalling circuit 11 enables the selector 41 when the transmit buffer 9 is ready to accept a fresh packet. Each user terminal 1A of a group is provided with an address filter, not shown, to detect a subpacket addressed to it, and is connected through an up-direction data line 42 to an associated input of the selector 40 and through an up-direction signalling line 43 to an associated input of the selector controller 41. A down-direction signalling line 44 is connected from an output of the selector controller 41 to each user terminal and down-direction data lines 45 to the terminals of the same group are conneccted together at the output of the receive buffer 8. A transmit request contained in the ACC subfield of a transmitted subpacket is detected by the selector controller 41. In more than one transmit request is applied to the selector controller 41, the latter proceeds to select one of them and writes the ACC subfield of subpackets to that effect and sends them through the appropriate down-direction signalling lines 44 to both the selected and nonselected user terminals. Selector controller 41 then directs the selector 40 to connect the up-direction data line 42 of the selected user terminal to the input of transmit buffer 9. This condition is maintained until the transmit request is removed. Each user terminal 1A is further provided with a circuit, not shown, that writes a flag into the ACC subfield to indicate that its receive buffer is ready or not ready to accept packets from the associated bus access unit 2A. On detecting a receive-ready flag, the selector controller 41 applies an enable pulse on line 49 to the receive buffer 8 to forward a received packet to the user terminals 1A. Otherwise, the selector controller 41 directs the receive buffer 8 to wait until the receive buffer of the destination terminal becomes ready to accept a packet. The address filter of each user terminal 1A examines the received packet to see if it is destined to it.

As shown in FIG. 10a, the selector controller 41 comprises a plurality of serial-to-parallel converters 46, a read only memory 47 and a latch 48. The parallel outputs of the serial-to-parallel converters 46 are connected together to the address input of the ROM 47 and the output of which is stored in the latch 48. The output of latch 48 is connected to the selector 40 and further fed back to the address input of the ROM 47.

Figure 11:
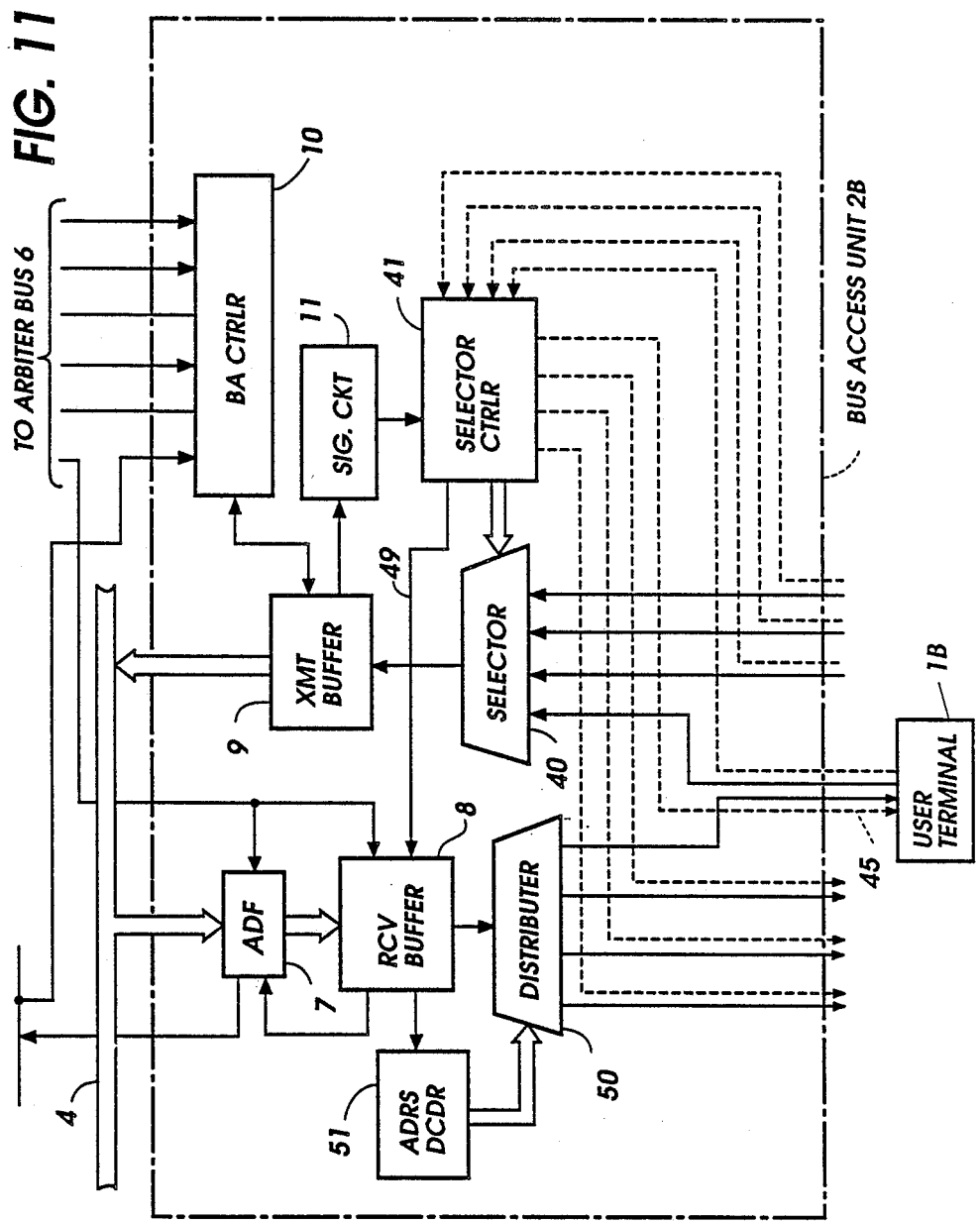
FIG. 11 is a block diagram of a modified form of the embodiment of FIG. 10.

Another embodiment shown in FIG. 11 is similar to the embodiment of FIG. 10 except that the bus access unit 2B further includes a distributor 50 and an address decoder 51. Distributor 50 has an input terminal connected to the output of receive buffer 8 and a plurality of outputs connected respectively through down-direction data lines 45 to a user terminal 1B having no address filter. Address decoder 51 examines the destination address field of each of the packets stored into the receive buffer 8 and directs the distributor 50 to connect the output of receive buffer 8 to one of the down-direction data lines 45 to which the destination terminal is connected.

Figure 12:
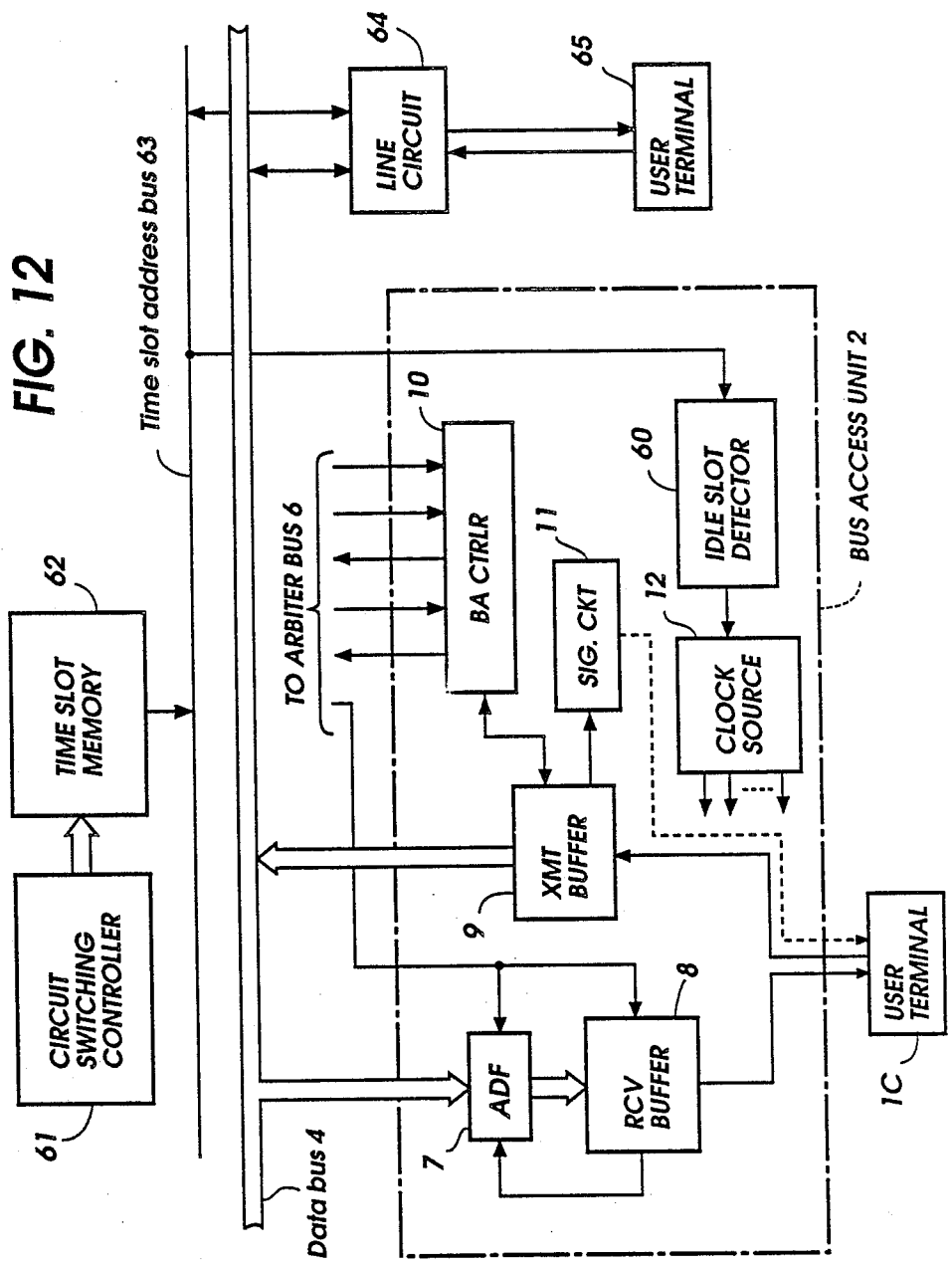
FIG. 12 is a block diagram of a second embodiment of the present invention in which a star topology local area network shares a common data bus with a circuit switching system.
Figure 13:
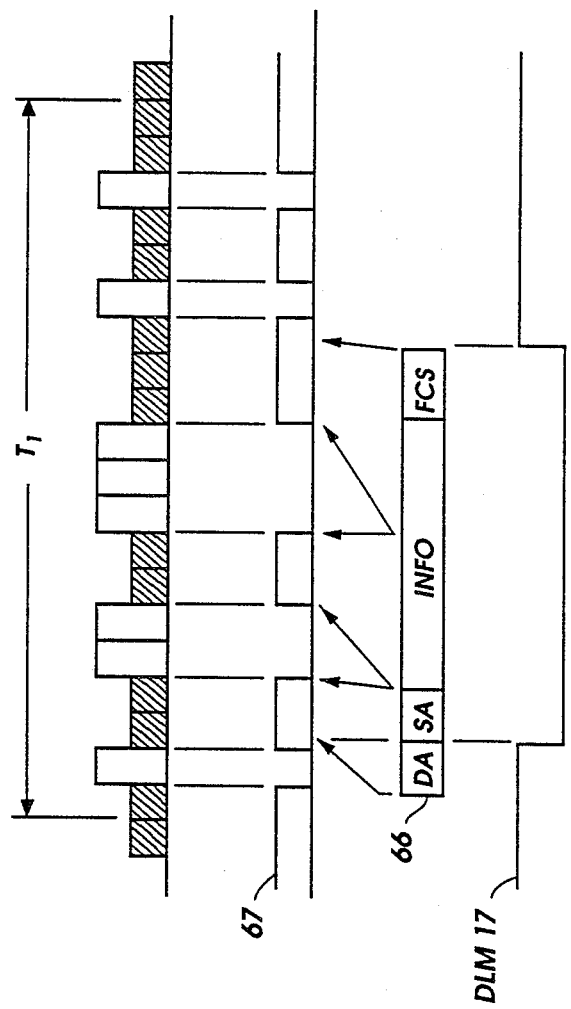
FIG. 13 is a timing diagram associated with FIG. 12.

The packet switching capability of the star topology local area network of the present invention can be advantageously used in conjunction with a circuit switching system. FIG. 12 illustrates a combined system in which the bus access unit 2c includes an idle slot detector 60 connected to a time slot address bus 63 for detecting idle time slots of a circuit switching system. Circuit switching system is formed by a circuit switching controller 61 and a time slot memory 62 which is connected to the time slot address bus 63. Line circuits 64 (only one is shown) are connected to the data bus 4 and to the time slot address bus 63 and circuit switched user terminals 65 are connected to line circuits 64. In this way, the data bus 4 is commonly shared by both packet-switched communication and circuit-switched communication. Circuit switching controller 61 writes the address of transmit and receive line circuits 64 in pairs into the time slot memory 62 and writes such an address into an idle time slot that does not specify any of the line circuits 64 and reads the stored data out of the memory at intervals $T_1$ onto the time slot address bus 63. Each of the line circuits 64 examines the address information propagating along the address bus 63 to effect the circuit switched communication. The idle slot detector 60 of each bus access unit 2C detects an idle time slot (as indicated by hatchings in FIG. 13) and enables the clock source 12 to activate the access unit 2C. If the bus access unit 2C has a packet 66 to transmit, it is decomposed into several subpackets 67 and inserted to the detected idle time slots during a period defined by a logic-0 state on the delimiter line 17. Since the delimiter line 17 needs to define the beginning and end of the transmission of a packet between packet user terminals, it is not necessary to switch the delimiter line 17 to the logic-1 level in the time slots which is occupied by circuit-switched calls. This embodiment allows what is called a "movable boundary" technique to be performed between packet- and circuit-switched systems to efficiently utilize the commonly shared data bus. In addition, the circuit switching system of any of conventional designs can be combined with the packet switching system of the present invention using the currently available circuit switching software without any modifications.

Figure 14:
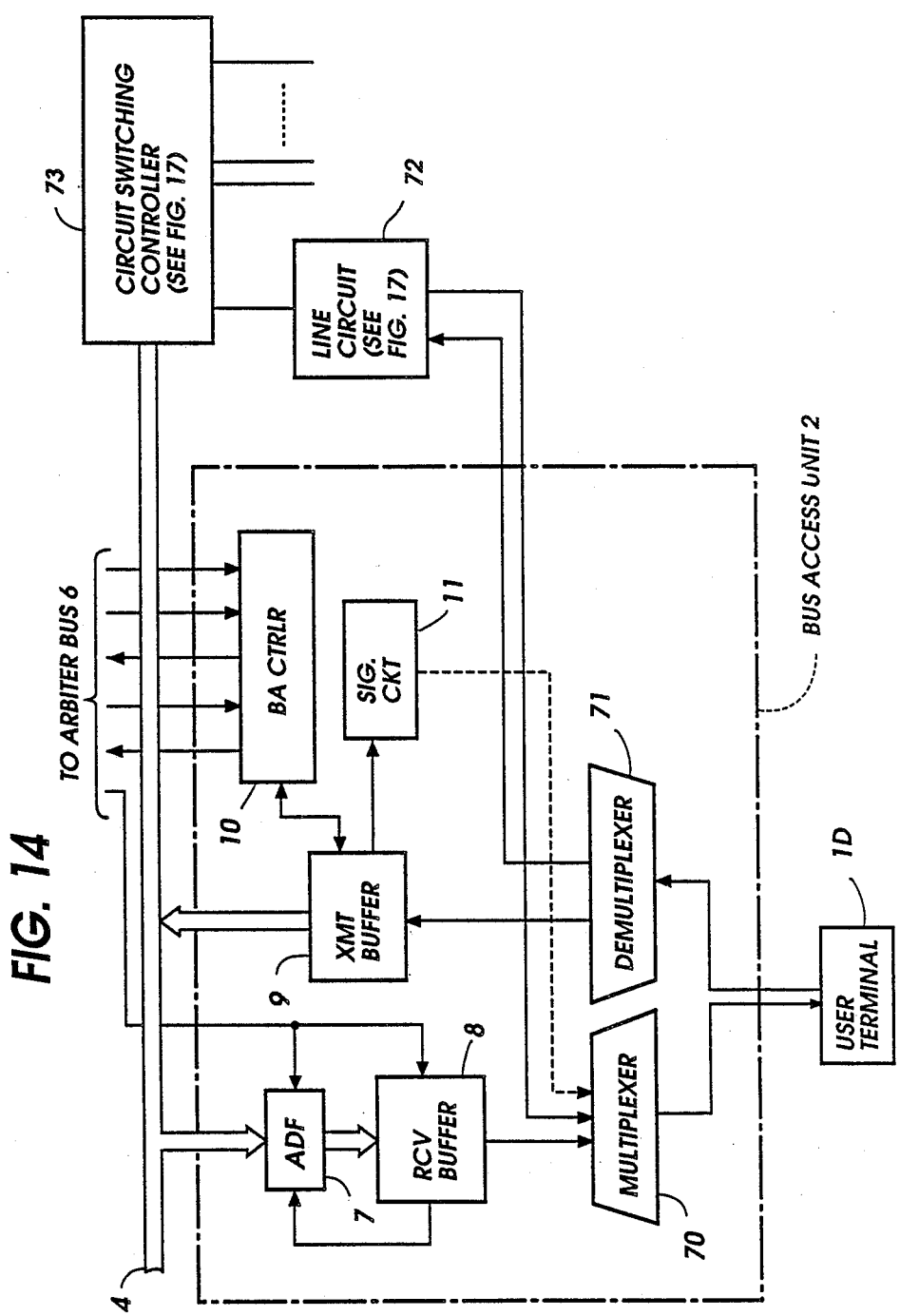
FIG. 14 is a block diagram of a modification of the second embodiment.

An embodiment shown in FIG. 14 differs from the embodiment of FIG. 12 in that it includes a bus access unit 2D which comprises a multiplexer 70 for multiplexing packet- and circuit-switched signals respectively from receive buffer 8 and a circuit-switched line circuit 72 into a combined signal for application to a user terminal 1D and a demultiplexer 71 for demultiplexing packet- and circuit-switched signals from the user terminal 1D into separate signals for application to transmit buffer 9 and line circuit 72. Line circuit 72 is connected to a circuit switching system 73 which shares the data bus 4 with the packet switching system.

Figure 15:
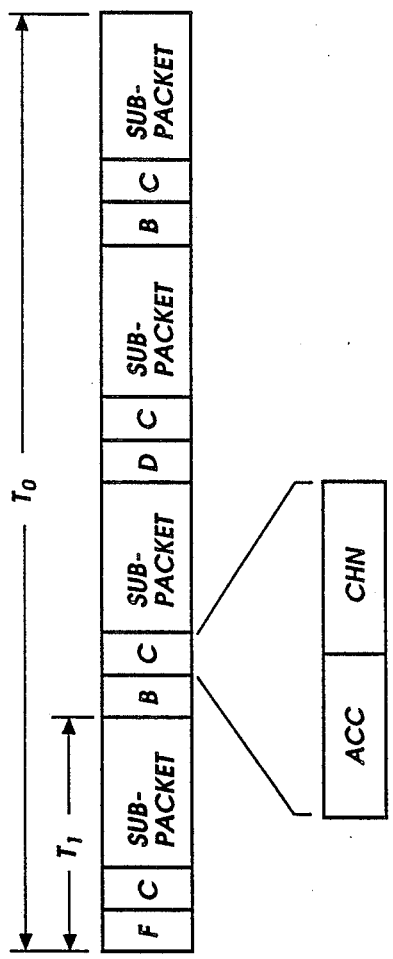
FIGS. 15 and 16 are timing diagrams associated with the embodiment of FIG. 14.
Figure 16:
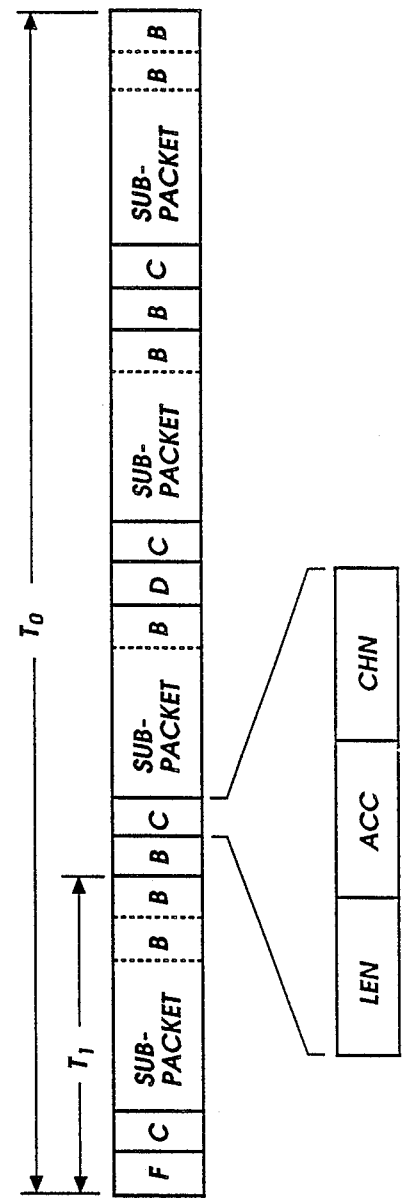

As illustrated in FIG. 15, the data structure of a packet sent from the user terminal 1D comprises a frame at intervals $T_0$ (typically, 125 microseconds) determined by the circuit switching system. Each frame is partitioned into four subframes, or time slots, of duration $T_1$. The first subframe comprises a frame sync field F. Each subfield is composed of a control field C and a subpacket field for carrying a packet-switched signal. Each control field C comprises an access subfield ACC and a chain subfield CHN. Circuit-switched signals of a 1-byte length are multiplexed into the frame. For this purpose, two subfields B are provided for each frame to accommodate the ISDN B-channel data signal (64 kbps) and a single subfield D is provided for each frame to accommodate the ISDN D-channel data for signalling. As shown in FIG. 16, the control field C of each frame data preferably includes a length subfield LEN to indicate the length of a subsequent subpacket field. This data structure enables the bandwidth of packet-switched data to be varied according to the varying traffic of the circuit switching system. The data format of FIG. 16 allows multiplexing of a circuit-switched signals of the H0 (384 kbps) communication mode in addition to the multiplexing of the 2-B channel communication mode.

Details of FIG. 14 are shown in FIG. 17. Each line circuit 72 comprises a line controller 80 connected to a control bus 86 and transmit and receive address comparators 81 and 82 and further to an interface 84. Interface 84 provides interface between the associated user terminal and transmit and receive buffers 83 and 85. Transmit and receive address comparators 81 and 82 are connected to an address bus 87 and transmit and receive buffers 83 and 85 are connected to the data bus 4. Circuit switching controller 73 includes a frame counter 88 for periodically reading a time slot memory 89, and a controlleer 90 which is connected to the control bus 86 to perform call setup operations by assigning a pair of addresses and storing them into idle time slots of the memory 89. The packets transmitted between the associated user terminal and the transmit and receive buffers 83 and 85 are exchanged through the interface 84. Line controller 80 handles the signalling information to and from the user terminal through the interface 84.

Assume that a user terminal 72-1 goes off-hook requesting a two-time slot length of data (128 kbps, for example) to be multiplexed into each frame destined to user terminal 72-2. The call request is transmitted the transmit buffer 83-1 to the control bus 86 and detected by the controller 90. On detecting the call request, controller 90 searches a list of available addresses to detect two vacant addresses "0001" and "0010", for example, and assigns the former to a source-to-destination path and the latter to a destination-to-source path, and conducts a further search to detect four vacant time slots #2, #4, #7 and #8, for example, in the time slot memory 89 and writes the address "0001" into time slots #4 and #7 and the address "0010" into time slots #2 and #8 as shown in FIG. 18. Thus, time slots #4 and #7 are used for transmission from terminal 72-1 to terminal 72-2 and time slots #2 and #8 are used for transmission from terminal from 72-2 to terminal 72-1. Simultaneously with the address assignment, the controller 90 transmits "0001" and "0010" as source and destination addresses to the line controllers 80-1 and 80-2. The source line controller 80-1 passes the received addresses "0001" and "0010" to transmit and receive address comparators 81-1 and 82-1, respectively, and the destination line controller 80-2 passes the received addresses "0010" and "0001" to transmit and receive address comparators 81-2 and 82-2, respectively. Each of the transmit and receive address comparators 81 and 82 includes a register in which the received address is stored for comparison with an address supplied from the time slot memory 89 through the address bus 87 to detect a match between them. Since the address information shown in FIG. 18A is transmitted from the time slot memory 89 to the address bus 87, the transmit address comparator 81-1 and the receive address comparator 82-2 detect a match in time slots #4 and #7 and respectively activate their associated transmit buffer 83-1 and receive buffer 85-2. Likewise, the receive address comparator 82-1 and transmit address comparator 81-2 detect a match in time slots #2 and #8 to respectively activate their associated receive buffer 85-1 and transmit buffer 83-2. In this way, source-to-destination connections are set up in time slots #4 and #7 and destination-to-source connections are set up in time slots #2 and #8. At the end of a communication, connections are cleared by erasing the contents of the memory cells and initializing the address comparators of the source and destination user terminals. The erased addresses will be assigned to subsequent communications.

It can be seen that multiple access communications can be achieved by allocating a plurality of time slots within a frame interval. Alternatively, by allocating a single receive address to N line circuits, the present embodiment can be operated in a 1:N multi-cast communication mode.

Applicant's experiments indicate that the time slot memory 89 can be determined exclusively by the number of time slots m in a frame and equals $m \log_2 m$. The time slot memory 89 and the width of the address bus 87 can be significantly reduced.

Figure 19:
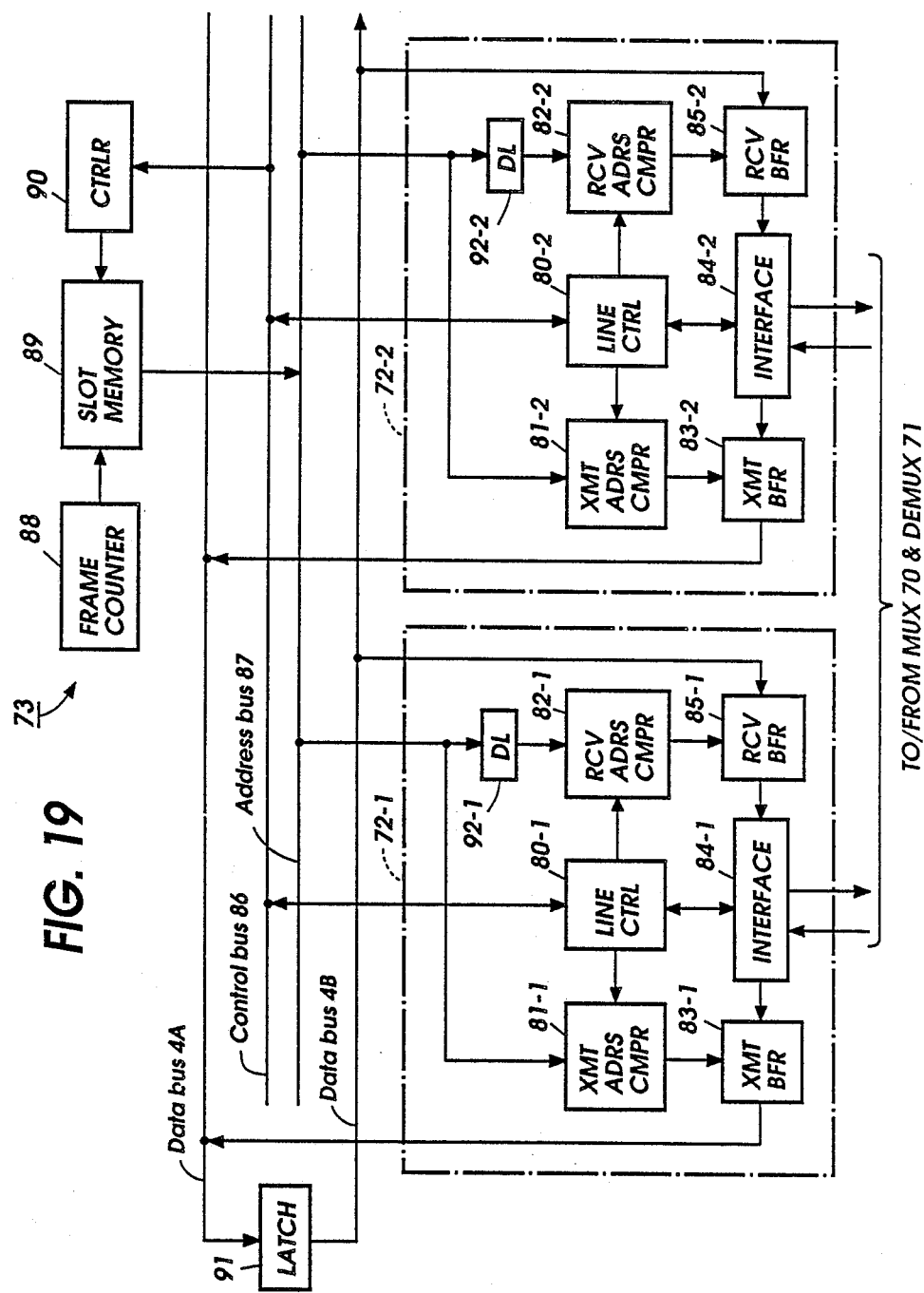
FIGS. 19, 20, 21 and 22 are block diagram of modified forms of the embodiment of FIG. 17.

To minimize waveform distortions of signals propagating along the data bus to which many circuits are connected, it is preferred that the data bus 4 be divided into transmit and receive data buses 4A and 4B to reduce the number of circuits connected to each data bus as illustrated in FIG. 19. In this embodiment, the transmit and receive data buses 4A and 4B are isolated from each other by means of a latch 91 which introduces a one time-slot delay to packets exchanged between line circuits 72. The transmit buffer 83 of all the line circuits 72 are connected to the transmit data bus 4A and the receive data bus 4B is connected to the receive buffers 85 of all line circuits 72. To compensate for the one time-slot delay introduced to packets propagating through the data bus, a one time-slot delay circuit 92 is connected between the address bus 87 and the receive address comparator 82 of each line circuit 72, so that each packet is time coincident with address data.

Figure 20:
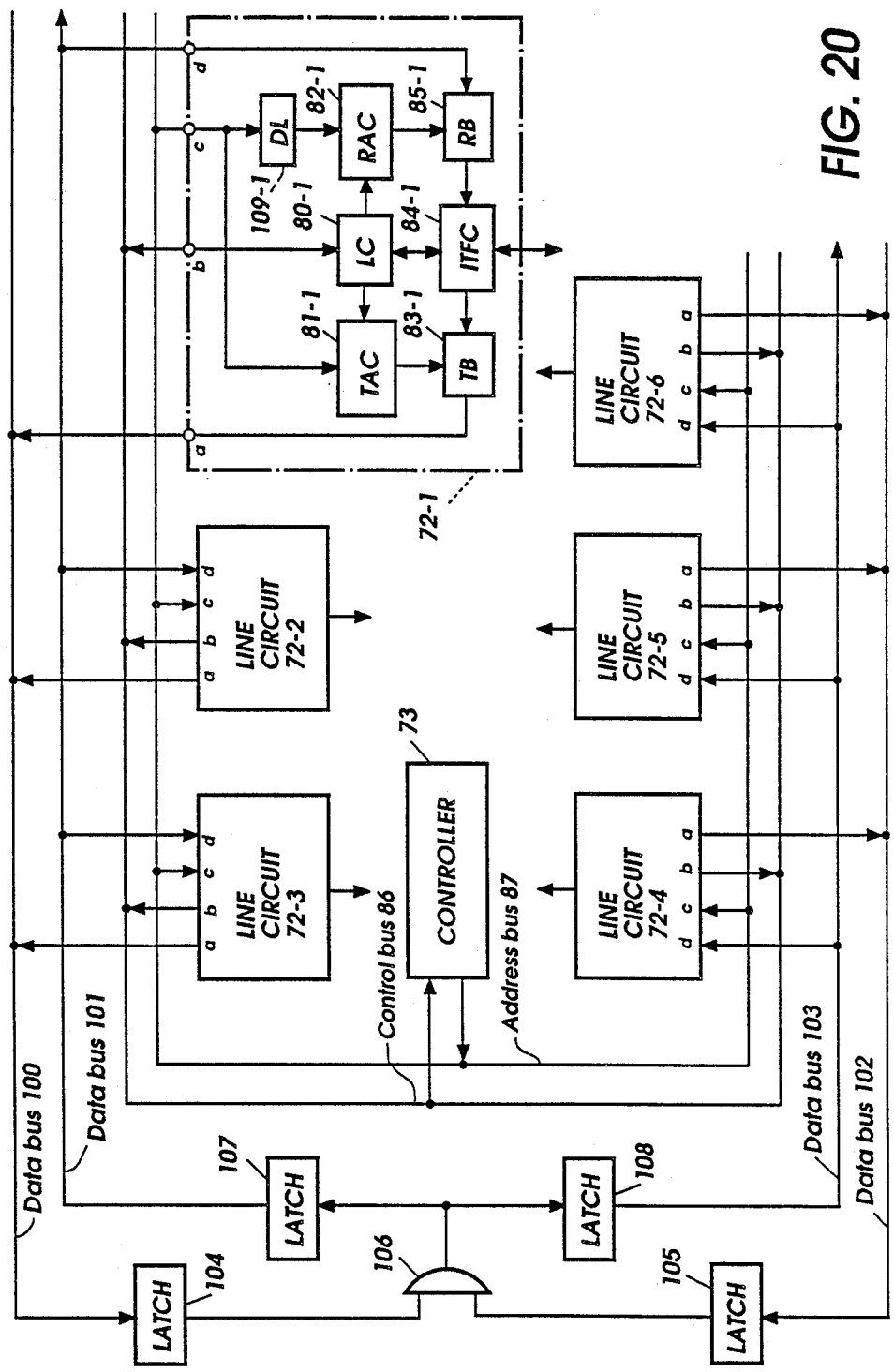
Figure 21:
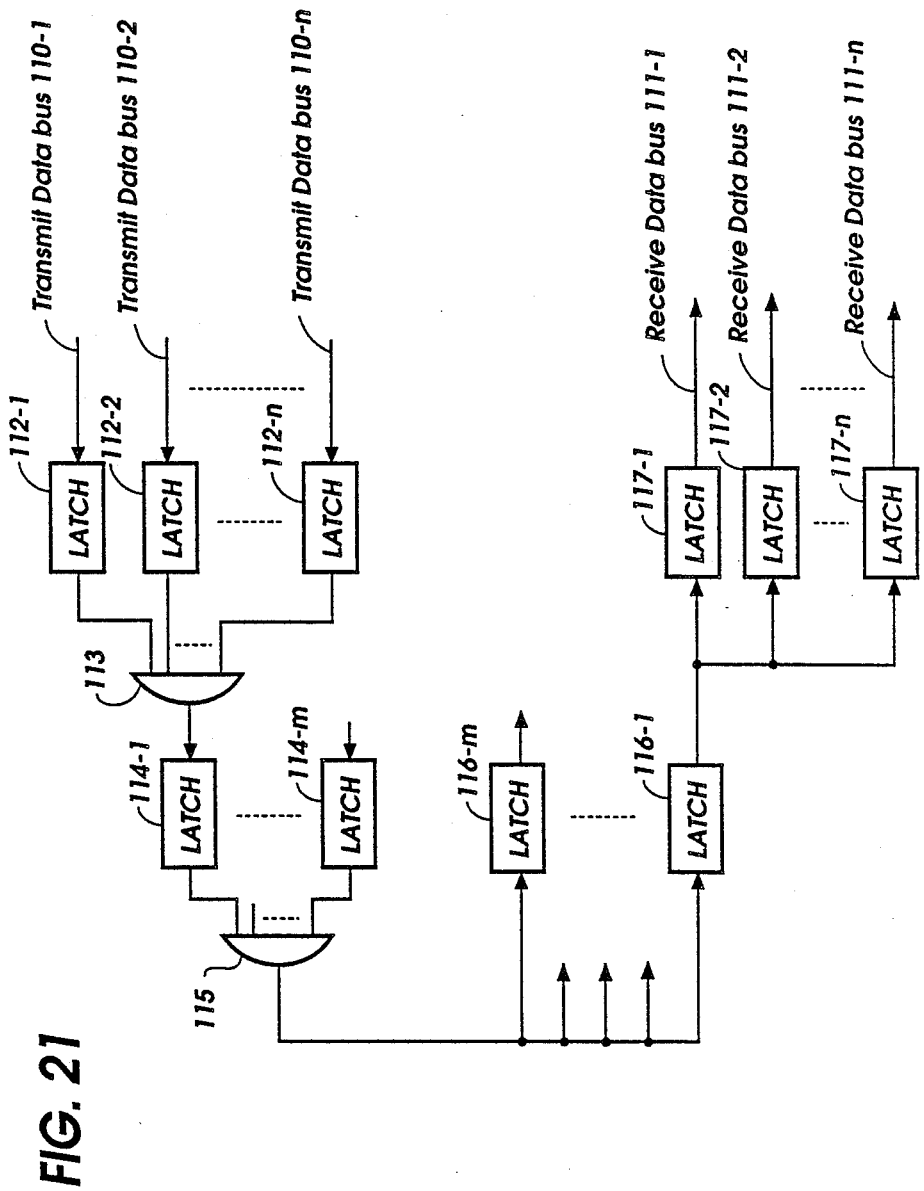

A modification of the embodiment of FIG. 19 is shown in FIG. 20 which is appropriate for a network serving a great number of user terminals 72. In FIG. 20, all the line circuits 72 are divided into two groups. For illustration, line circuits 72-1 to 72-3 form a first group which is connected to a first transmit data bus 100 and a first receive data bus 101 and line circuits 72-4 to 72-6 form a second group which is connected to a second transmit data bus 102 and a second receive data bus 103. The first transmit data bus 100 is terminated by a latch 104 whose output is connected to one input of an AND gate 106 and the second transmit data bus 102 is terminated by a latch 105 whose output is connected to the other input of AND gate 106. The output of AND gate 106 is connected to latches 107 and 108 to which the first and second receive data buses 101 and 103 are respectively connected. Each of the transmit data buses 100 and 102 is at a logic-1 level when there is no packet to transmit in the associated group of line circuits. Thus, when there is no packet propagating along the both transmit data buses, the output of AND gate 106 and hence the outputs of latches 107 and 108 are at logic 1. When a packet is transmitted from the line circuit 72-1, for example, while there is no packet to transmit in the other group, latch 104 produces a logic-1 following a one-time-slot delay, causing AND gate 106 to switch to a logic-0 state. Following another one time-slot delay, the outputs of latches 107 and 108 switch to logic-0 state. To compensate for the time difference between the address data on bus 87 and a packet, a two time-slot delay circuit 109 is connected between the address bus 87 and the receive address comparator 82 of each line circuit. Latches 104 and 107 minimize waveform distortions and ensure proper time-slot synchronization between line circuits. While AND gate 106 is used for coupling the groups of line circuits, an OR gate may could be employed instead if the absence of a packet on a transmit data bus is indicated by a logic-0. It will be seen that a greater number of line circuits can be served by dividing the line circuits into m×n groups and providing gate circuits and latches in stages as shown in FIG. 21. As illustrated, m×n groups of line circuits are respectively connected through transmit data buses 110-1 to 110-n to latches 112-1 through 112-n whose outputs are combined to a gate circuit 113. The output of the gate circuit 113 is in turn connected to a latch 114-1 which is connected to a gate circuit 115 to which other latches 114-2 (not shown) to 114-m are also connected. The output of gate circuit 115 is connected to latches 116-1 to 116-m which correspond respectively to latches 114-1 to and 114-m. The output of latch 116-1 is connected to latches 117-1 to 117-n whose outputs are respectively connected to receive data buses 111-1 to 111-n to which n groups of line circuits of one of m "supergroup" are connected.

Figure 22:
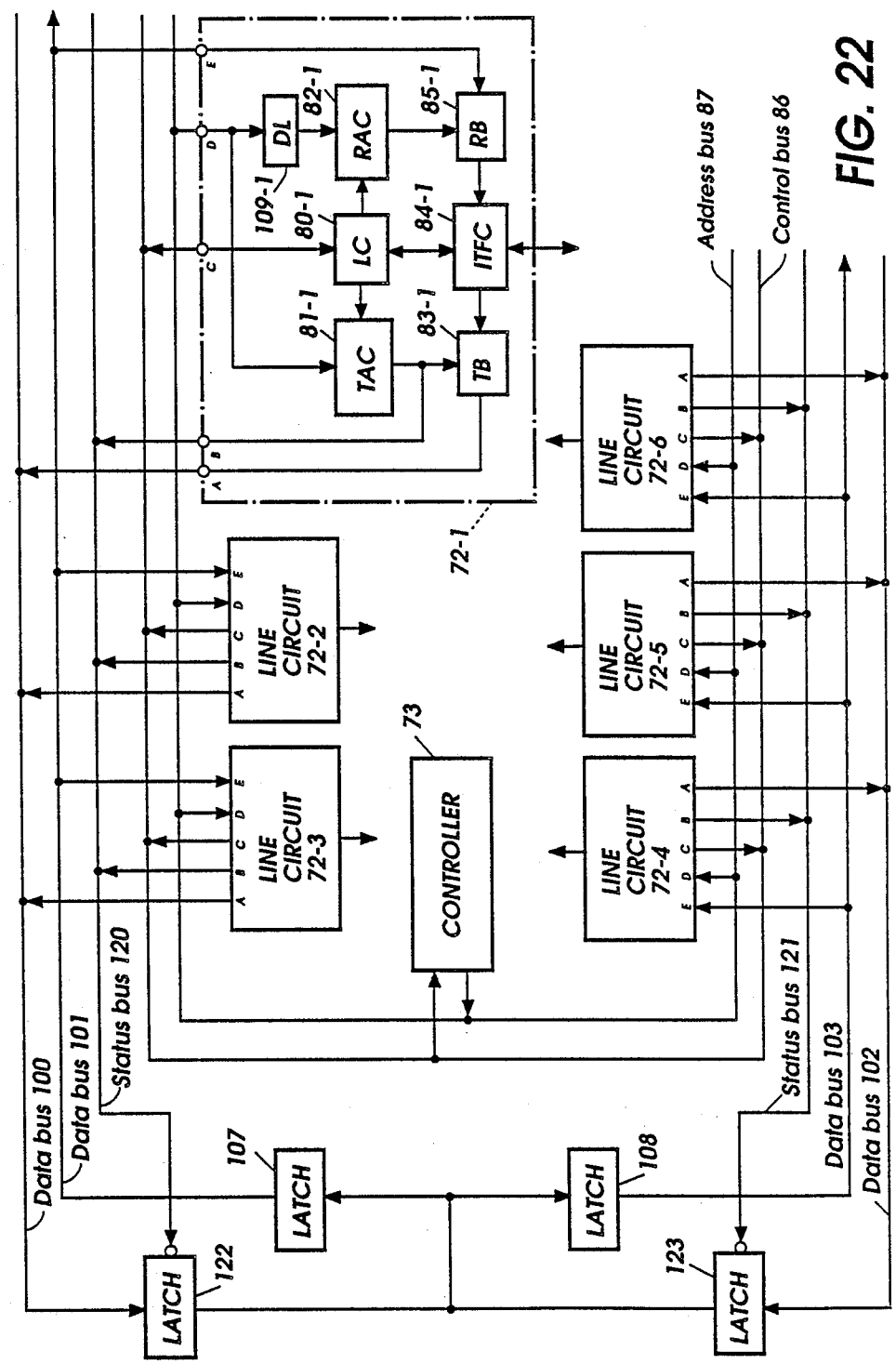

The gate circuit 106 of the embodiment of FIG. 20 can be dispensed with in a manner as shown in FIG. 22 with the use of status buses 120 and 121 and tri-state latches 122 and 123 instead of the latches 104 and 105 of FIG. 20. The output of transmit address comparator 81 of each of the line circuits 72-1 to 72-3 is connected to the status bus 120 and the output of transmit address comparator 81 of each of the line circuits 72-4 to 72-6 is connected to the status bus 121. Status buses 120 and 121 are connected respectively to the enable ports of the latches 122 and 123. Each line circuit 72 switches the associated status bus to a logic-0 state when it is assigned a time slot for transmission. This enables the associated tri-state latch to permit a packet to be transmitted from the requesting line circuit.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A star topology local area network comprising:
    a data bus;
    a receive-not-ready bus;
    a plurality of bus access units associated respectively with user terminals for receiving a transmit request therefrom, each of said bus access units including a transmit buffer for storing a packet from the accociated user terminal and forward it to said bus when priority is assigned thereto and a receive buffer for storing a packet from said data bus and forwarding it to the associated user terminal, address filter means for detecting a packet addressed to it and applying a receive-not-ready signal to said receive-not-ready bus when said receive buffer has a capacity insufficient to receive said detected packet, bus access means connected to said receive-not-ready bus for terminating the transmission of a packet in response to said receive-not-ready signal, and signalling means for detecting the storage capacity of said transmit buffer and transmitting a proceed-to-send signal to the associated user terminal indicating the permission of transmission when the detected storage capacity is sufficient to receive a packet from the associated user terminal; and
    arbiter means for assigning priority to one of said bus access units when a plurality of said request occur simultaneously and allowing said priority assigned bus access unit to transmit a packet to said data bus.

2. A star topology local area network as claimed in claim 1, wherein a message signal from each of said user terminals is time-division multiplexed with said transmit request into an up-direction packet and a message signal from each of said bus access units is time-division multiplexed with said proceed-to-send signal into a down-direction packet.

3. A star topology local area network as claimed in claim 2, wherein each of said up-direction packet and down-direction packet is divided into a plurality of subpackets of equal length and said subpackets are transmitted on time slots, each of said subpackets including a signal indicating the location of each subpacket within a packet.

4. A star topology local area network as claimed in claim 3, wherein one of said subpackets that comes last in each of said up-direction and down-direction packets includes a signal indicating the length of data to be contained in said last subpacket.

5. A star topology local area network as claimed in claim 1, 2, 3 or 4, wherein each of said user terminals transmits a receive-not-ready signal to the associated bus access unit to indicate when the user terminal is not ready to receive a packet from the associated bus access unit, and wherein each of said bus access units is responsive to said receive-not-ready signal from the associated user terminal to disable the transmission of a packet to the associated user terminal.

6. A star topology local area network as claimed in claim 1, wherein said arbiter comprises:
    first, second and third lines connected to said bus access units;
    a random number generator for applying a random sequence of bits to said first line;
    exclusive OR gate means having inputs connected respectively to said first and second lines and an output connected to said third line; and
    timing means for applying a timing pulse to said bus access units, wherein each of said bus access units comprises:
    a register for generating a sequence of address bits in response to said timing pulse;
    a first exclusive OR gate having a first input connected to said first line and a second input connected to the output of said register;
    a second exclusive OR gate having a first input connected to said third line and a second input connected to the output of said register to detect a coincidence between the logic levels of said first and second inputs thereof; and
    means for presenting a wired logical product of a first logic output from said first exclusive OR gate to said second line in response to said timing pulse and presenting a wired logical product of subsequent logic outputs from said first exclusive OR gate in response to the occurrence of said coincidence detected by said second exclusive OR gate; and
    means for causing said transmit buffer to discard a packet stored therein if said coincidence does not occur for each of said address bits and causing said transmit buffer to forward said packet to said data bus if said coincidence occurs for each of said address bits.

7. A star topology local area network as claimed in claim 6, wherein said timing pulse is generated in response to a transmit request from the bus access unit to which priority is assigned.

8. A star topolocy local area network as claimed in claim 6, wherein said timing pulse is generated during the time a packet is propagating through said data bus, and wherein the bus access unit to which priority is assigned during said time forwards a packet to said data bus following the end of propagation of said packet.

9. A star topology local area network as claimed in claim 6, wherein said timing pulse is generated at periodic intervals so that priority may be assigned to different bus access units in sequence, and wherein a preceding one of said different bus access units discards a packet stored in the associated transmit buffer and a succeeding one of said different bus access units transmits a packet to said data bus following the end of propagation of another packet along said data bus.

10. A star topology local area network as claimed in claim 6, 7, 8 or 9, wherein said user terminals are divided into groups and a plurality of said arbiter means are provided to respectively serve said groups of user terminals, each of said user terminals being assigned an address, the first bit of the address of each of said user terminals being a first binary logic value, each of said arbiter means further comprises:

pulse generating means (37) for generating a bit of a first binary logic value in response to said timing pulse;

a first gate means (33) for logically combining the output of said random number generator with said bit of first binary logic value and applying a combined logical output to said first line (13);

detector means (36) for detecting a simultaneous occurrence of said bit of first binary logic value from said pulse generating means (37) and a bit of first binary logic value from said exclusive OR gate means (35); and a second gate means (34) for logically combining the output of said exclusive OR gate means (35) with a binary signal and supplying a combined logical output to said third line (15), further comprising an arbiter selector for supplying a signal of a second binary logic value to the second gate means (34) of each of said arbiter means as said binary signal, selecting one of said arbiter means which detect the simultaneous occurrence of said bits of first binary logic value and switching said binary signal supplied to the selected arbiter means to the first binary logic value.

11. A star topology local area network as claimed in claim 1, wherein one or more of said bus access units serve a group of user terminals, each of said user terminals being identified by a unique address.

12. A star topology local area network as claimed in claim 11, wherein each of said bus access units further comprises:

a selector (40) for selectively coupling said user terminals (1A) of said group to said transmit buffer in response to a control signal applied thereto; and control means (41) for selecting one of the user terminals of said group which simultaneously generate a request for transmission and generating said control signal identifying said selected user terminal, wherein the output of said receive buffer is connected to said user terminals of said group for simultaneous transmission of same packets, each of said user terminals of said group comprising an address filter for detecting a packet addressed to it.

13. A star topology local area network as claimed in claim 11, wherein each of said bus access units further comprises:

a selector (40) for selectively coupling said user terminals of said group to said transmit buffer in response to a first control signal applied thereto;

control means (41) for selecting one of the user terminals of said group which simultaneously generate a transmit request and generating said first control signal identifying the selected user terminal;

a distributor (50) for selectively coupling the output of said receive buffer to said user terminals of sid group in response to a second control signal applied thereto; and address decoder means (51) for detecting one of the user terminals of said group to which a packet received by said receive buffer is destined and generating said second control signal identifying said distination user terminal.

14. A star topology local area network as claimed in claim 12 or 13, wherein said control means (41) is disabled in the absence of said proceed-to-send signal from said signalling means.

15. A star topology local area network as claimed in claim 12 or 13, wherein each of said user terminals of said group transmits a receive-not-ready signal to the associated bus access unit indicating that said each user terminal is not ready to receive a packet, and wherein said associated bus access unit is responsive to said receive-not-ready signal from one of the associated user terminals to suspend transmission of a packet from said receive buffer.

16. A star topology local area network as claimed in claim 1, 2, 3, 4, 6, 7, 8 or 9, further comprising:

a plurality of line circuits (64) to which circuit-switched user terminals are connected;

circuit switching control means (61, 62) for defining time slots on said data bus and controlling said line circuits to transmit circuit-switched signals to said data bus on the defined time slots; and means (60) for detecting an idle time slot in said data bus and activating said bus access units (2) to multiplex a packet into the detected idle time slot.

17. A star topology local area network as claimed in claim 3 or 4, wherein each of said user terminals transmits and receives a circuit-switched signal in addition to the subpackets of either up-direction and down-direction packet, further comprising:

a plurality of line circuits associated respectively with said bus access units; and circuit switching control means (73) for defining time slots on said data bus and controlling said line circuits to transmit circuit-switched signals to said data bus on the defined time slots, each of said bus access units comprising a multiplexer (70) for multiplexing a packet from said receive buffer with a circuit-switched signal from the associated line circuit and a demultiplexer (71) for demultiplexing a signal from said user terminal into a packet and a circuit-switched signal and applying the demultiplexed packet to said transmit buffer and applying the demultiplexed circuit-switched signal to the associated line circuit.

18. A star topology local area network as claimed in claim 17, wherein said circuit-switched signal from the associated line circuit is decomposed and multiplexed with said subpackets of down-direction packet into a down-direction frame, and the circuit-switched signal from said user terminal is decomposed and multiplexed with the subpackets of up-direction packet into an up-direction frame, each of said frames comprising a plurality of subframes each containing a said subpacket and a decomposed portion of the circuit-switched signal and a signal indicating the length of the subpacket in each of said subframes.

19. A star topology local area network as claimed in claim 17, wherein said circuit switching contról means (73) comprises:

a control bus (86) connected to said line circuits;

an address bus (87) connected to said line circuits;

a time slot memory (89) connected to said address bus;

control means (90) connected to said control bus and responsive to a transmit request supplied from said line circuits through said control bus for detecting idle time slots in said memory, assigning transmit and receive addresses respectively to a source-to-destination connection and a destination-to-source connection, and storing the assigned addresses into said detected idle time slots; and means (88) for periodically reading the stored addresses out of said memory onto said address bus;

wherein each of said line circuits (72) comprises:

first comparator means (81) connected to said address bus for storing said transmit address of a first arrival from said address bus and comparing the stored address with the transmit addresses of subsequent arrivals;

second comparator means (82) connected to said address bus for storing said receive address of a first arrival from said address bus and comparing the stored address with the receive addresses of subsequent arrivals;

a transmit buffer (83) for storing a circuit-switched signal from said demultiplexer and forwarding it to said data bus when a coincidence occurs in said first comparator means; and a receive buffer (85) for storing a circuit-switched signal from said data bus and forwarding it to said multiplexer when a coincidence occurs in said second comparator means.

20. A star topology local area network as claimed in claim 19, wherein said data bus is divided into a transmit data bus (4A) connected to the transmit buffer of each of said line circuits and a receive data bus (4B) connected to the receive buffer of each of said line circuits, an output end of said transmit being connected to an input of a latch (91) and an input end of said receive data buses being connected to an output of said latch, each of said line circuits comprising a delay circuit connected between said address bus and said second comparator means for introducing a delay to said receive address by an amount equal to the amount of delay introduced by said latch.

21. A star topology local area network as claimed in claim 19, further comprising first, second, third and fourth latches (104, 105, 107, 108) and a logical gate means (106), wherein said line circuits are divided into first and second groups and said data bus is divided into first and second transmit data buses (100, 102) and first and second received data buses (101, 103), said first transmit and receive data buses (100, 101) being respectively connected to the transmit and receive buffers of the first group line circuits and said second transmit and receive data buses (102, 103) being respectively connected to the transmit and receive buffers of the second group line circuits, said first and second transmit data buses (100, 102) being connected at their output ends to inputs of said first and second latches (104, 105) respectively and said first and second receive data buses (101, 103) being connected at their input ends to outputs of said third and fourth latches (107, 108) respectively, outputs of said first and second latches being connected to said logical gate means (106) and an output of said logical gate means being connected to inputs of said third and fourth latches (107, 108), each of said first group line circuits comprising a delay circuit (109) connected between said address bus and the second comparator means thereof for introducing a delay to said receive address by an amount equal to the amount of delays introduced by said first and third latches (104, 107), and each of said second group line circuits comprising a delay circuit (109) connected between said address bus and the second comparator means thereof for introducing a delay to said receive address by an amount equal to the amount of delays introduced by said second and fourth latches (105, 108).

22. A star topology local area network as claimed in claim 19, wherein said line circuits are divided into $M=N$ groups and said data bus is divided into $M=N$ groups of transmit data buses and $M=N$ groups of receive data buses, the transmit buffers of the line circuits of each of said $M=N$ groups being connected to a corresponding one of said $M=N$ transmit data buses and the receive buffers of the line circuits of each of said $M=N$ groups being connected to a corresponding one of said $M=N$ receive data buses, further comprising:

an array of first $M=N$ latches (112) having inputs respectively connected to output ends of said $M=N$ transmit data buses;

an array of first M logical gate means (113) each having N inputs respectively connected to outputs of corresponding N latches of said first $M=N$ latches (112);

an array of second M latches (114) connected respectively to outputs of said first M logical gate means (113);

a second logical gate means (115) having M inputs connected respectively to outputs of said second M latches (114);

an array of third M latches (116) having inputs connected to an output of said second logical gate means (115); and an array of fourth $M=N$ latches (117) having inputs connected together by M groups to outputs of said third M latches (116), outputs of said fourth $M=N$ latches being connected respectively to said $M=N$ receive data buses.

23. A star topology local area network as claimed in claim 19, further comprising first and second status buses (120, 121) and first, second, third and fourth latches (122, 123, 107, 108), said first and second latches (122, 123) being of a tristate type and respectively having enable terminals connected to output ends of said status buses (120, 121), wherein said line circuits are divided into first and second groups, and said data bus is divided into first and second transmit data buses (100, 102) and first and second receive data buses (101, 103), wherein an output of said first comparator means (81) of each of the first group line circuits is connected to said first status bus (120) and an output of said first comparator means (81) of each of the second group line circuits is connected to said second status bus (121), said first transmit and receive data buses (100, 101) being respectively connected to the transmit and receive buffers of the first group line circuits and said second transmit and receive data buses (102, 103) being respectively connected to the transmit and receive buffers of the second group line circuits, said first and second transmit data buses (100, 102) being connected at their output ends to inputs of said first and second latches (122, 123) respectively and said first and second receive data buses (101, 103) being connected at their input ends to outputs of said third and fourth latches (107, 108) respectively, outputs of said first and second latches (122, 123) being connected together to inputs of said third and fourth latches (107, 108), each of said first group line circuits comprising a delay circuit (109) connected between said address bus and the second comparator means thereof for introducing a delay to said receive address by an amount equal to the amount of delays introduced by said first and third latches (104, 107), and each of said second group line circuits comprising a delay circuit (109) connected between said address bus and the second comparator means thereof for introducing a delay to said receive address by an amount equal to the amount of delays introduced by said second and fourth latches (105, 108).

* * * * *

UNITED STATES PATENT AND TRADEMARK OFFICE
CERTIFICATE OF CORRECTION

PATENT NO. : 4,866,702
DATED : September 12, 1989
INVENTOR(S) : Horoshi Shimizu et al It is certified that error appears in the above-identified patent and that said Letters Patent is hereby corrected as shown below:

Column 7, line 5, delete "logic-2", and insert --logic-o--.

Column 11, line 3, delete "controlleer 90", and insert --controller 90--.

Column 18, lines 14-42/claim 22, change each occurrence of "M=N" to --M x N--.

Signed and Sealed this

Twenty-fifth Day of December, 1990

Attest:

HARRY F. MANBECK, JR.

Attesting Officer     Commissioner of Patents and Trademarks